US012056934B2

(12) United States Patent
Goel

(10) Patent No.: US 12,056,934 B2
(45) Date of Patent: Aug. 6, 2024

(54) THREE-DIMENSIONAL OBJECT DETECTION BASED ON IMAGE DATA

(71) Applicant: Zoox, Inc., Foster City, CA (US)

(72) Inventor: Kratarth Goel, Albany, CA (US)

(73) Assignee: Zoox, Inc., Foster City, CA (US)

( * ) Notice: Subject to any disclaimer, the term of this patent is extended or adjusted under 35 U.S.C. 154(b) by 139 days.

(21) Appl. No.: 17/390,234

(22) Filed: Jul. 30, 2021

(65) Prior Publication Data

US 2023/0029900 A1    Feb. 2, 2023

(51) Int. Cl.
*G06V 20/56* (2022.01)
*G06V 20/64* (2022.01)

(52) U.S. Cl.
CPC .............. *G06V 20/56* (2022.01); *G06V 20/64* (2022.01)

(58) Field of Classification Search
CPC ....... G06V 20/56; G06V 20/64; G06V 20/647
See application file for complete search history.

(56) References Cited

U.S. PATENT DOCUMENTS

| 10,937,178 B1 | 3/2021 | Srinivasan | |
|---|---|---|---|
| 2014/0307298 A1* | 10/2014 | Lee | G03H 1/0808 359/9 |
| 2020/0025935 A1* | 1/2020 | Liang | G06V 10/764 |
| 2020/0193630 A1 | 6/2020 | Mousavian et al. | |
| 2020/0311983 A1 | 10/2020 | Mavridis et al. | |
| 2020/0404238 A1 | 12/2020 | Nakata et al. | |
| 2023/0033177 A1 | 2/2023 | Goel | |

FOREIGN PATENT DOCUMENTS

| CN | 110427917 B | 3/2022 | |
|---|---|---|---|
| KR | 102252947 B1 | 10/2017 | |
| KR | 20170111135 A * | 10/2017 | ............... G03H 1/04 |

(Continued)

OTHER PUBLICATIONS

"Ammar Abbas et al. A Geometric Approach to Obtain a Bird's Eye View from an Image, Proceedings of the IEEE/CVF International Conference on Computer Vision [ICCV], 2019" (Year: 2019).*

(Continued)

*Primary Examiner* — Andrae S Allison
*Assistant Examiner* — Phuong Hau Cai
(74) *Attorney, Agent, or Firm* — Lee & Hayes, P.C.

(57) ABSTRACT

Techniques are discussed herein for generating three-dimensional (3D) representations of an environment based on two-dimensional (2D) image data, and using the 3D representations to perform 3D object detection and other 3D analyses of the environment. 2D image data may be received, along with depth estimation data associated with the 2D image data. Using the 2D image data and associated depth data, an image-based object detector may generate 3D representations, including point clouds and/or 3D pixel grids, for the 2D image or particular regions of interest. In some examples, a 3D point cloud may be generated by projecting pixels from the 2D image into 3D space followed by a trained 3D convolutional neural network (CNN) performing object detection. Additionally or alternatively, a top-down view of a 3D pixel grid representation may be used to perform object detection using 2D convolutions.

20 Claims, 10 Drawing Sheets

(56) References Cited

FOREIGN PATENT DOCUMENTS

WO     WO2022001865 A1     1/2022

OTHER PUBLICATIONS

"Shang-Lin Yu et al., Vehicle detection and localization on bird's eye view elevation images using convolutional neural network, 2017 IEEE International Symposium on Safety, Security and Rescue Robotics (SSRR) Shanghai, China, Oct. 11-13, 2017" (Year: 2017).*
The PCT Search Report and Written Opinion mailed Nov. 17, 2022 for PCT application No. PCT/US2022/038824, 11 pages.
Office Action for U.S. Appl. No. 17/390,174, mailed on Aug. 31, 2023, Kratarth Goel, "Three-Dimensional Point Clouds Based On Images and Depth Data", 11 pages.
Office Action for U.S. Appl. No. 17/390,174, mailed on May 4, 2023, Goel, "Three-Dimensional Point Clouds Based On Images and Depth Data", 9 pages.
Office Action for U.S. Appl. No. 17/390,174, mailed on Jan. 30, 2024, Kratarth Goel, "Three-Dimensional Point Clouds Based On Images and Depth Data", 12 pages.

\* cited by examiner

THREE-DIMENSIONAL OBJECT DETECTION BASED ON IMAGE DATA

BACKGROUND

Autonomous vehicles may capture and use various sensor data to detect objects and determine routes through physical environments. For instance, an autonomous vehicle may utilize object detection, prediction, and route planning techniques to control the vehicle when traversing an environment that includes static and dynamic objects. The autonomous vehicle may make decisions while traversing an environment to ensure safety for passengers and surrounding persons and objects. Receiving accurate and precise sensor data, as well as performing accurate analyses of the sensor data, can assist the autonomous vehicle to better understand the objects in the surrounding environment. However, sensors may have limited range and/or may provide low density of data associated with an environment, and accurately detecting, predicting, or inferring the objects in the environment based on the sensor data can present technical challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
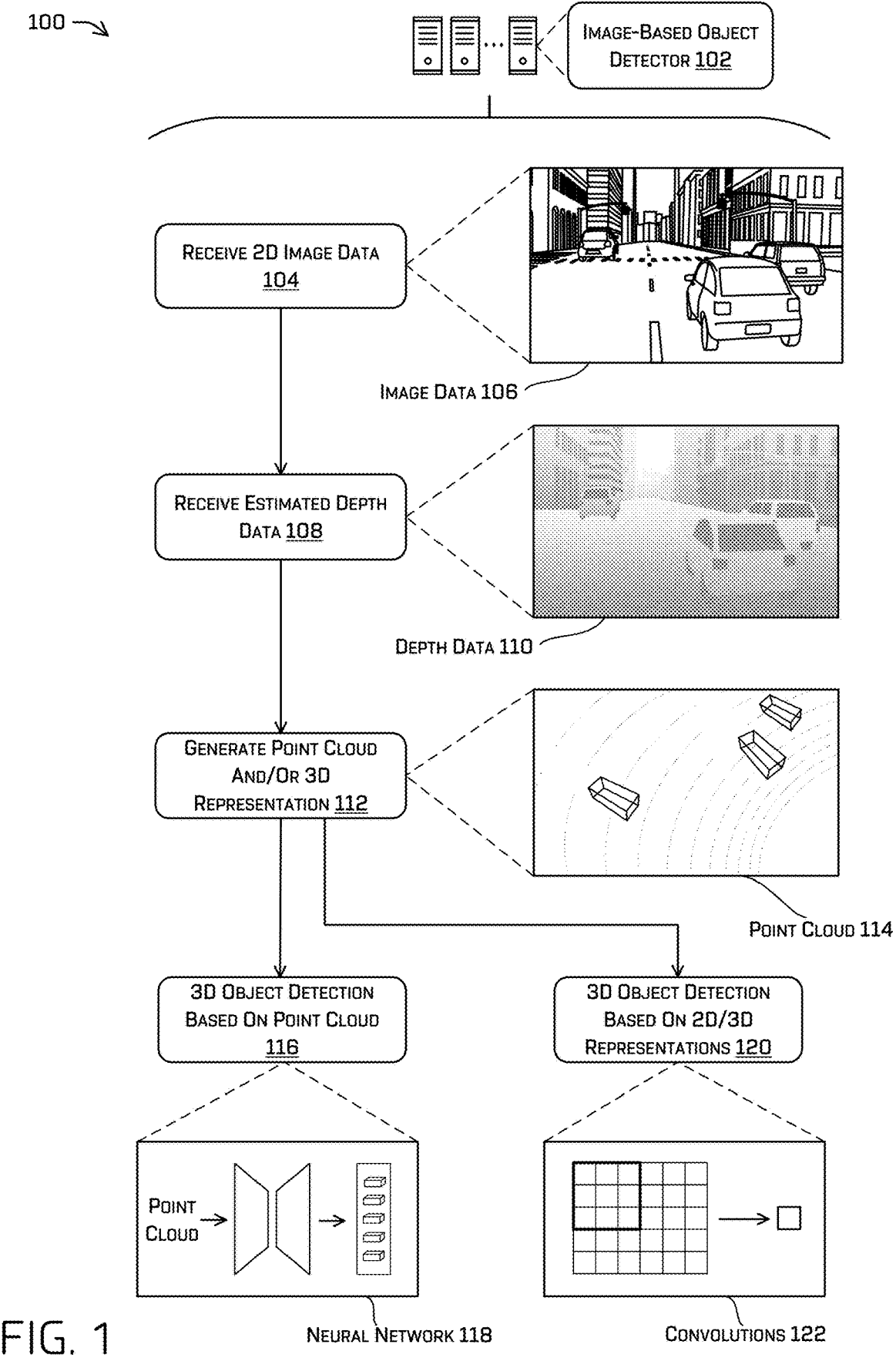
FIG. 1 illustrates example techniques including generating 3D representations of 2D image data, and performing 3D object detection using the 3D representations, in accordance with one or more implementations of the disclosure.

Various techniques described herein relate to generating three-dimensional (3D) representations of an environment based on two-dimensional (2D) image data, and using the 3D representations to perform 3D object detection and other 3D analyses of the environment. In some examples, an image-based object detector within an autonomous vehicle may receive 2D image data captured by a camera of the autonomous vehicle. The image-based object detector can receive associated depth data (e.g., per pixel depth estimations) and generate one or more 3D representations of the environment based on the 2D image data and depth data. In some cases, the image-based object detector may project each pixel within a region of interest of the 2D image, such as a bounding box or instance mask of an object, into a 3D space. The projected pixels may form a point cloud, and the image-based object detector may execute trained 3D object detection networks and/or algorithms on the point cloud.

Additionally or alternatively, the image-based object detector may generate a 3D grid representation of the region of interest, having a width and height based on the width and height of the region, and a depth based on a predetermined number of depth quanta. For instance, each per-pixel depth estimate may be quantized (or binned) based on increasing ranges of depth values into a corresponding depth quanta. The 3D grid representation may be generated without performing pixel projections into the 3D space. After generating the 3D grid representation, the image-based object detector may shift the axis of the 3D grid representation and perform 2D convolutions on a top-down view of the 3D grid, to perform feature extracting, linear transformation, and object detection.

Although certain examples described herein may apply to autonomous vehicles performing image-based object detection when traversing environments, these techniques may be applied in other examples to any image data analysis based on depth data. For autonomous vehicle-based applications, these techniques may provide technical advantages that improve vehicle and passenger safety, as well as the efficient operation of the autonomous vehicle. For example, techniques described herein may improve image-based object detection and avoidance functionality in vehicles, in which 3D representations (e.g., point clouds and/or 3D grids) are generated based on 2D image data to allow the vehicle to perform more robust 3D object detection, prediction, inference, and planning. Additionally, 3D point clouds generated based on 2D image data and associated per-pixel depth estimates can be provided as input trained 3D networks and object detection algorithms designed to process point clouds output by lidar and/or radar systems. Thus, autonomous vehicles may leverage 3D object detection networks and algorithms more efficiently based on image data, without the need to capture and process lidar and/or radar data as well. The image-based 3D object detection techniques described herein also may be combined with additional 2D image-based object detection operations to improve the efficiency and quality image-based object detection. Further, as described below, the examples in which a 3D grid representation is generated instead of an image-based point cloud may provide additional efficiency advantages by reducing the processing overhead of pixel projections.

FIG. 1 is a pictorial flow diagram illustrating an example process 100 of generating 3D representation(s) based on 2D image data, and performing one or more 3D object detection techniques using the 3D representations. As shown in this example, some or all operations of the example process 100 may be performed by an image-based object detector 102 executing on one or more computing devices. Process 100, and various other examples herein, may be described in reference to performing object detection functionalities (e.g., object identification, classification, instance segmentation, semantic segmentation, and/or object tracking) by an autonomous vehicle operating within an environment. For example, an autonomous vehicle may include an image-based object detector 102, implemented within one or more on-board vehicle systems (e.g., perception, prediction, planning, etc.), which may be used to improve the object detection capabilities of the autonomous vehicle. In such examples, based on the object detection performed by the image-based object detector 102 (and/or other vehicle systems), the autonomous vehicle may generate a trajectory for controlling the vehicle and navigating within its current environment. The autonomous vehicle also may use the outputs from the image-based object detector 102 to activate a secondary vehicle controller, a remote teleoperations computing device, and/or may engage or disengage certain autonomous driving features, based on the detection and analyses of the objects in the environment.

Further, it can be understood from the context of this disclosure that techniques described herein are not limited to object detection techniques performed by autonomous vehicles. In other examples, an image-based object detector 102 may be implemented within other moving vehicles (e.g., watercraft, aircraft, spacecraft, etc.), mobile devices having cameras (e.g., smartphones, tablet computers, wearable devices, etc.), imaging and image analysis systems, or within fixed-location camera systems used for traffic monitoring, security, surveillance, and the like.

At operation 104, the image-based object detector 102 (e.g., within a vehicle) receives image data 106 associated with an environment. In some examples, vehicle sensors may be configured to capture the image data 106 via one or more cameras (or image sensors) on the vehicle, including but not limited to red-green-blue (RGB) cameras, intensity cameras (greyscale), infrared cameras, ultraviolet cameras, etc. As noted above, the image-based object detector 102 may be implemented within a vehicle with computing device(s) that include a perception engine and/or a planner and perform operations such as detecting, identifying, segmenting, classifying, and/or tracking objects from sensor data collected from the environment. In such examples, as the vehicle traverses through an environment, the image sensors can capture image data 106 associated with the environment, and provide the image data to the image-based object detector 102. The image data 106 captured by the vehicle sensors can be associated with objects including, but not limited to other vehicles, cyclists, pedestrians, buildings, road surfaces, signage, barriers, etc. The image data can represent dynamic objects and/or static objects.

Dynamic objects can include objects that are associated with a movement (e.g., vehicles, motorcycles, cyclists, pedestrians, animals, etc.) or capable of movement (e.g., parked vehicles, standing pedestrians, etc.) within the environment. Static objects can include non-moving objects within the environment, such as buildings/structures, road surfaces, road markers, signage, barriers, trees, sidewalks, etc.

At operation 108, the image-based object detector 102 receives depth data 110 associated with the image data received in operation 104. The depth data 110 may include estimated depth values representing distances between the vehicle (and/or the camera that captured the image data 106) and the different regions (e.g., pixels) of the image data 106. The depth data 110 received in operation 108 may include depth data for an entire image, or may include depth data corresponding only to one or more regions of interest within the image data 106. In some cases, the image-based object detector 102 may perform initial 2D object detection techniques on the image data 106 (e.g., algorithms, trained neural networks or machine-learned models), to identify one or more regions of interest in the image data containing objects such as other vehicles, bicycles, pedestrians, traffic signs/signals, etc. In such cases, receiving the depth data in operation 108 may include receiving the output of one or more neural networks (or other depth estimation techniques) configured to output per pixel depth estimation data based on received 2D image data input. A region of interest may correspond to a bounding box and/or may be defined by the boundaries of an instance mask representing an object detected within the 2D image data 106. After identifying the regions of interest within the image data 106, the image-based object detector 102 may determine depth data 110 for the particular regions of interest.

In some examples, determining the depth data 110 in operation 108 may include providing some or all of the image data 106 to a machine-learning model and/or algorithm trained to determine depth estimates for each pixel in the image data 106. The image-based object detector 102 may use models and algorithms trained based on lidar and/or radar ground truth data, and/or may be configured based on heuristic-based rules regarding object size averages and distributions (e.g., average lengths for cars, trucks, and bicycles, average height and height distributions for pedestrians, standard sizes for traffic signs, lane markings, sidewalk widths, etc.).

To generate the depth data 110, the image-based object detector 102 may input the image data 106 into machine-learned algorithm or model that has been trained with training image data and training depth data (e.g., lidar data) as ground truth data. Examples of various techniques for training and using machine-learned models and algorithms to determine estimated depth data and associated confidence values for each pixel within the image data can be found, for example, in U.S. patent application Ser. No. 15/803,682, filed Nov. 3, 2017, and titled "Radar False Negative Analysis," which was granted on Mar. 3, 2020 as U.S. Pat. No. 10,580,158. Additional examples of techniques for training and using machine-learned models and algorithms to determine estimated depth data based on image data and localization and/or map data can be found, for example, in U.S. patent application Ser. No. 16/408,407, filed May 9, 2019, and titled "Image-Based Depth Data and Localization." Examples of further techniques for determining object depths with an environment by taking into account attributes in the environment can be found, for example, in U.S. patent application Ser. No. 16/452,304, filed Jun. 25, 2019, and titled "Refining Depth From An Image." Each of U.S. patent application Ser. Nos. 15/803,682, 16/408,407, and 16/452, 304 are incorporated by reference herein, in their entirety for all purposes. The image-based object detector 102 may use any the techniques described in these applications, alone or in combination, to determine the depth data 110 in operation 108.

At operation 112, the image-based object detector 102 may generate one or more 3D representations, based on the image data 106 and the associated depth data 110. In various examples, the 3D representation(s) generated by the image-based object detector 102 may include 3D point clouds and/or 3D grids, described below in more detail. The image-based object detector 102 may generate a single 3D representation corresponding to an entire image, or one or more smaller 3D representations corresponding to regions of interest (e.g., bounding boxes or instance masks) determined based on 2D object detection of the image data 106.

When generating a 3D point cloud 114, the image-based object detector 102 initially may construct a 3D data structure to represent the 3D space of the point cloud. The image-based object detector 102 may then project each individual pixel from the image data 106 (or the particular region(s) of interest in the image data 106) into the 3D space, using the estimated depth of the pixel to be projected and the characteristics of the camera that captured the image data 106. As described below in more detail, the focal length of the camera, the location of the pixel within the image plane, and the estimated depth of the pixel may be used to determine a projected location for the pixel into the 3D space of the point cloud. As described below in more detail, the generating 3D point clouds provides advantages in that the point clouds can be rotated around one or multiple axes in the 3D space, transformed, and/or provided as input to 3D networks/models. The point cloud 114 is shown in this example has been rotated to show a perspective view of the environment, and includes three 3D bounding boxes corresponding to objects (e.g., vehicles) detected in the environment. The regions of the point cloud 114 behind each of the three bounding boxes (from the perspective of the camera) do not include any points, indicating that those regions of the environment are obscured from the view of the camera by the three objects.

The image-based object detector 102 also may generate a 3D representation as a 3D grid in operation 112, instead of or in addition to generating a point cloud. For instance, a 3D representation of a 2D region of interest in an environment (e.g., bounding box or instance mask) may be constructed as a 3D grid having width and height dimensions based on the width and height of the region of interest, and having a depth dimension based on a predetermined range of depth values provided by the image-based object detector 102. In some examples, the image-based object detector 102 may determine a depth quanta (or bin) for a pixel based on the estimated depth data for the pixel, from a predetermined fixed number of depth quanta. In some examples, 48 different depth quanta may be supported, and each depth quanta may be associated with a different range of depth values. In such examples, each pixel may be assigned to a single depth quanta based on its estimated depth value, and the corresponding location for each pixel in the depth dimension of the 3D grid may be updated to indicate the presence of the pixel within the depth quanta range.

When depth quanta ranges (or depth bins) are used, the depth quanta ranges may be determined using either uniform or non-uniform ranges of depth values. In some cases, the depth quanta ranges may be increased in size as they move further from the camera, based on a linear, polynomial, logarithmic, or exponential scale. As an example, a first depth quanta may correspond to a depth range of 0 to 1 feet, a second depth quanta may correspond to a depth range of 1 to 3 feet, a third depth quanta may correspond to a depth range of 3-6 feet, and so on. A single region of interest (e.g., bounding box or instance mask) associated with an object may be associated with a single depth quanta, or may span multiple depth quanta, based on the size of the object and depth of the object from the camera. Additionally, although the use of the depth quanta ranges is described in this example for use when generating 3D grids, depth quanta ranges also may be used when generating point clouds. For instance, before projecting a pixel into the 3D space for a point cloud 114, the image-based object detector 102 may determine a depth quanta (or bin) for the pixel based on its estimated depth value. In some examples, all pixels within the same depth quanta may be projected into the point cloud 114 using the same depth value. As an example, if a depth quanta range corresponds to depth values between 8-10 feet from the camera, each pixel having an estimated depth value within that depth quanta range may be projected using the same depth value in the projection calculation, which may be the near boundary of the depth quanta range (e.g., 8 feet), the center of the depth quanta range (e.g., 9 feet), or other value associated with the depth quanta range.

At operation 116, the image-based object detector 102 may perform one or more 3D object detection techniques using a 3D point cloud representation generated in operation 112. As shown in this example, the 3D object detection techniques performed based on a point cloud may include executing neural network 118 (e.g., a 3D convolutional neural network (CNN)) configured to perform object detection techniques based on a 3D point cloud provided as input to the neural network 118. In various other examples, the 3D object detection techniques performed in operation 116 may include any combination of heuristics, algorithms, trained machine-learned models, and/or neural networks configured to perform 3D object detection based on an input point cloud. In some cases, the neural network 118 (and/or other object techniques performed in operation 116) may be designed or trained to receive lidar or radar point clouds. Thus, one advantage of the techniques described herein is the capacity to leverage algorithms, trained models, and/or networks that were built or trained to receive lidar or radar point clouds, without the need to operate the lidar or radar sensors to obtain an input point cloud, by instead using image-based point clouds which may be more efficient to generate in some computing environments.

At operation 120, the image-based object detector 102 may perform additional 3D object detection techniques based on a 3D grid representation generated in operation 112. As shown in this example, the object detection techniques performed based on a 3D grid may include performing convolutions 122 (e.g., 2D or 3D convolutions) on the 3D grid representation. As described below in more detail, after the image-based object detector 102 has generated a 3D grid representation including one or more objects in the image data 106, the image-based object detector 102 may perform 2D convolutions on a top-down view of the 3D grid. For instance, the 3D grid may be rotated about its x- or y-axis to expose a top-down view of the environment, and the image-based object detector 102 may perform 2D convolutions on the top-down view of the 3D bounding boxes within the environment. In some cases, the image-based object detector 102 may perform 2D convolutions on multiple different views, such as a first set of 2D convolutions on the front view of a 3D bounding box, and second set of 2D convolutions on the side view of the 3D bounding box, and a third set of 2D convolutions on the top view of a 3D bounding box, and the combination of extracted features from each set of 2D convolutions may be used to perform the object detection functionalities. As noted above, object detection based on deep learning techniques using convolutions 122 may be executed more efficiently (e.g., requiring less processing and memory overhead) than object detection performed on a 3D point clouds. Further, as noted above the techniques for generating a 3D grid may provide speed and efficiency advantages in that they do not require pixel projection calculations.

As shown in this example, operation 116 and operation 120 may represent alternative processing paths, in which one set of object detection operations is performed when the image-based object detector 102 provides a point cloud, and another set of object detection operations is performed when the image-based object detector 102 provides a 3D grid. In other examples, the image-based object detector 102 may generate both a point cloud and a 3D grid in operation 112 corresponding to the same image data 106 (or same region within the image data 106), and may perform both the object detection techniques in the operation 116 based on the point cloud and the object detection techniques in operation 120 based on the 3D grid. Although a neural network 118 and convolutions 122 are shown as illustrative examples, the 3D object detection performed in operation 116 and/or operation 120 can include various combinations of 3D object detection techniques and/or other image analysis functionality, including but not limited to object detection or identification, object classification, instance segmentation, semantic segmentation, object tracking, feature extraction, and/or transformation.

As illustrated in FIG. 1, the image-based object detector 102 may perform various different 3D object detection techniques in different examples. Different 3D object detection techniques may be performed based on various different inputs. For example, scene data associated with an environment may be stored as one or a combination of a point cloud, a multi-channel image, a 3D grid, and/or various other 2D or 3D representations/views of the environment. The scene data associated with an environment may be provided as input to various 3D object detection techniques, including techniques configured to receive 3D scene data representations such as point clouds, or techniques configured to receive 2D scene data such as top-down 2D representations/scene data. Each of the examples of scene data described herein, including point clouds, multi-channel images with depth data, 3D grids and/or other representations/views may be determined as described herein based on a combination of the 2D image data and the associated depth data. In the illustrated example, operation 116 may include any 3D object detection technique that can be performed on a point cloud 114, including but not limited to providing the point cloud 114 to a neural network 118 (e.g., a 3D CNN or any other feedforward neural network). In other examples, the image-based object detector 102 may be configured to quantize or voxelize the point cloud 114 into a grid output, and/or may determine various 2D or 3D views based on the point cloud 114. In such examples, operation 116 may include the image-based object detector 102 performing 3D object detection techniques based on the voxelized point cloud data, one or more 2D or 3D views of the environment (e.g., top-down views, perspective views, etc.) based on matrices of X, Y, and Z coordinate vectors for each pixel. Additionally or alternatively, operation 116 may include pointpillars encoding techniques based on a representation of the point cloud 114 in vertical columns (or pillars).

In the illustrated example, operation 120 includes convolutions 122 (e.g., 2D or 3D convolutions) performed on one or more 2D or 3D views of environment. However, in other examples operation 120 may include any 3D object detection technique(s), performed alone or in combination, based on non-point cloud representations of the environment. As described below in more detail, the input to operation 120 may include a 3D grid with operations X and coordinates based on a width and height determined from the 2D image data, and a Z coordinate based on the associated depth data. Operation 120 may include generating a 2D or 3D spatial grid, and performing convolutions based on a view (e.g., top-down view, side view, etc.) of the spatial grid. To generate a 2D or 3D view in operation 120, the image-based object detector 102 may generate a grid representation based on the 2D image data and depth data as described in more detail below. Additionally or alternatively, the image-based object detector 102 may determine 2D or 3D representations without generating a grid, by incorporating associated per-pixel depth data into the visual data (e.g., RGB data) for each pixel in the 2D image data.

As described below in more detail, in some examples the 3D object detection techniques performed in operation 116 and/or operation 120 may include convolutions. In some instances, to perform convolutions the image-based object detector 102 may be configured to quantize the depth data to more effectively perform 2D convolution techniques on 2D or 3D datasets. For example, quantization of the depth data may unite ranges of different (but similar) estimated depths for nearby points on an object in the 2D image, causing the depth dimension for the object to be represented as an unbroken line segment or curve within a top-down view or other representation of the object. Accordingly, quantizing the depth data to produce continuity in the depth dimension allows convolutions to be performed more effectively for feature extraction and/or object detection.

When implemented in an autonomous vehicle, the autonomous vehicle may use the output of the image-based object detector 102 to generate a trajectory for controlling operation of the vehicle, based at least in part on image-based 3D object detection techniques discussed herein. Additionally or alternatively, the autonomous vehicle may activate a secondary vehicle controller, a remote teleoperations computing device, and/or may engage or disengage certain autonomous driving features, based on the output detection outputs of the image-based object detector 102, using the various techniques discussed herein.

Figure 2:
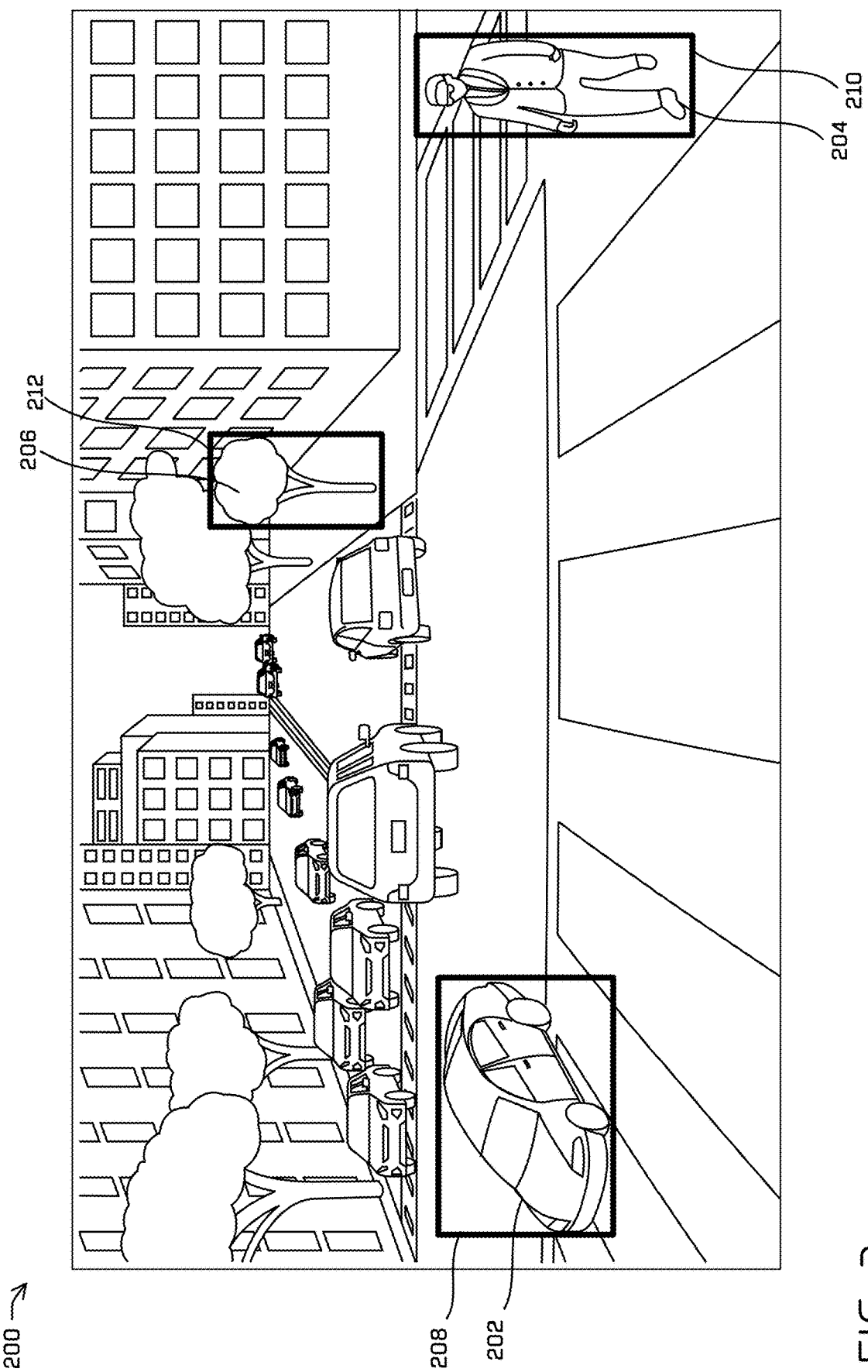
FIG. 2 illustrates example 2D image data of an environment captured by a camera of an autonomous vehicle, in accordance with one or more implementations of the disclosure.

FIG. 2 is an example image 200 depicting a number of objects detected in an environment. As noted above, in some examples image 200 may correspond to image data 106, or other images captured by a camera of an autonomous vehicle as the vehicle traverses the environment. The image 200 in this example shows a number of objects in the environment, including a vehicle 202, pedestrian 204, tree 206, and various other static and dynamic objects that are present in the field of view of the vehicle-mounted camera used to capture image 200.

In some examples, the image-based object detector 102 within the vehicle may perform 2D object detection operations to determine region(s) of interest within the image 200. In this example, the image-based object detector 102 has determined a bounding box 208, bounding box 210, and bounding box 212, corresponding respectively to the vehicle 202, pedestrian 204, and tree 206. In other examples, the image-based object detector 102 may use 2D object detection and instance segmentation to determine instance masks for the detected objects, rather than bounding boxes.

Figure 3:
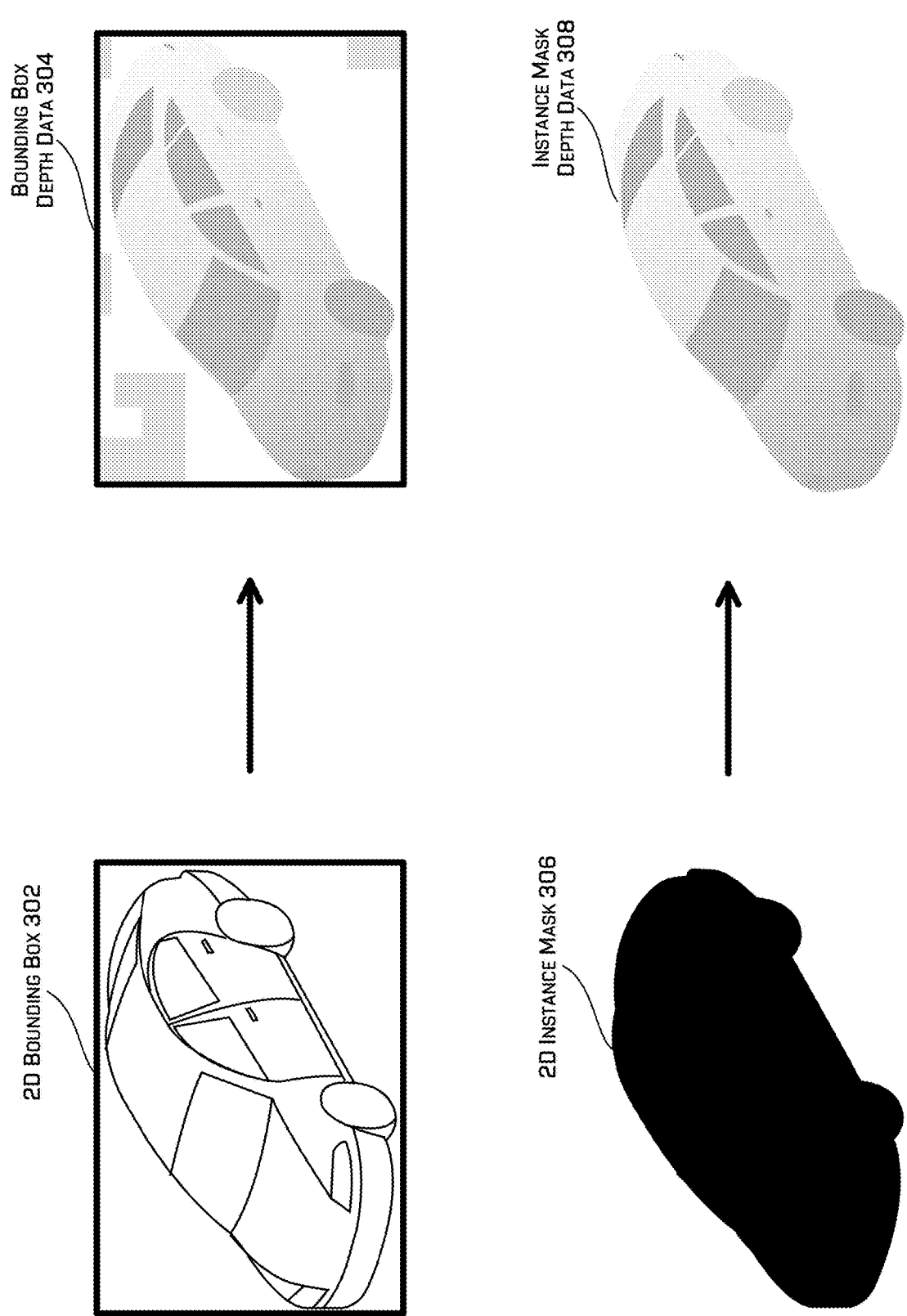
FIG. 3 depicts a bounding box and instance mask for a region of interest within a 2D image, along with associated depth data, in accordance with one or more implementations of the disclosure.

FIG. 3 illustrates two examples of depth data associated with regions of interest in an image determined by the image-based object detector 102. In this example, in response to a 2D bounding box 302 determined based on a detection of the vehicle 202 (e.g., using classification/localization techniques performed on the image 200), the image-based object detector 102 may receive or determine corresponding depth data 304. The depth data 304 may include an estimated depth value for each pixel within the 2D bounding box 302, including both the pixels of the vehicle 202, and other pixels in the 2D bounding box that may correspond to other objects or the background of the image. In contrast, in response to a 2D instance mask 306 determined for the vehicle 202 (e.g., using instance segmentation techniques performed on the image 200), the image-based object detector 102 may receive or determine corresponding depth data 308. The depth data 308 may include an estimated depth value for each pixel within the instance mask 306, which in this example may include only pixels associated with the vehicle 202, and not any pixels associated with other objects or the image background.

In some cases, depth data 304 and depth data 308 may be received by the image-based object detector 102 from a depth data component executing one or more estimated depth data algorithms/models/networks/etc. For instance, the image-based object detector 102 may transmit a request to a depth data component including the boundaries of one or more regions of interest within an image 200, in order to receive back estimated depth data for the region(s). In other cases, the image-based object detector 102 may determine depth data 304 and depth data 308, using any combination of image-based depth data estimation techniques, including but not limited to those described above in operation 108. Additionally, as these examples illustrate, determining an instance mask 306 for an object (e.g., vehicle 202) detected in an environment may be preferable in some implementations to determining a bounding box 302 for the object. By determining an instance mask 306, less estimated depth data may be required, and the resulting depth data may be cleaner and more readily analyzed without depth data from other object or background noise. Additionally, determining an instance mask 306 more precisely tailored to the profile of the object (e.g., as a convex hull) may result in fewer pixel projections. These advantages may improve object detection speed, and reduces the processing and memory overhead required by the vehicle to perform object detection in the environment. However, in some cases these advantages partially or fully offset by the additional processing of instance segmentation required to determine an instance mask 306, and the greater likelihood of outputting an inaccurate or erroneous region of interest.

Figure 4A:
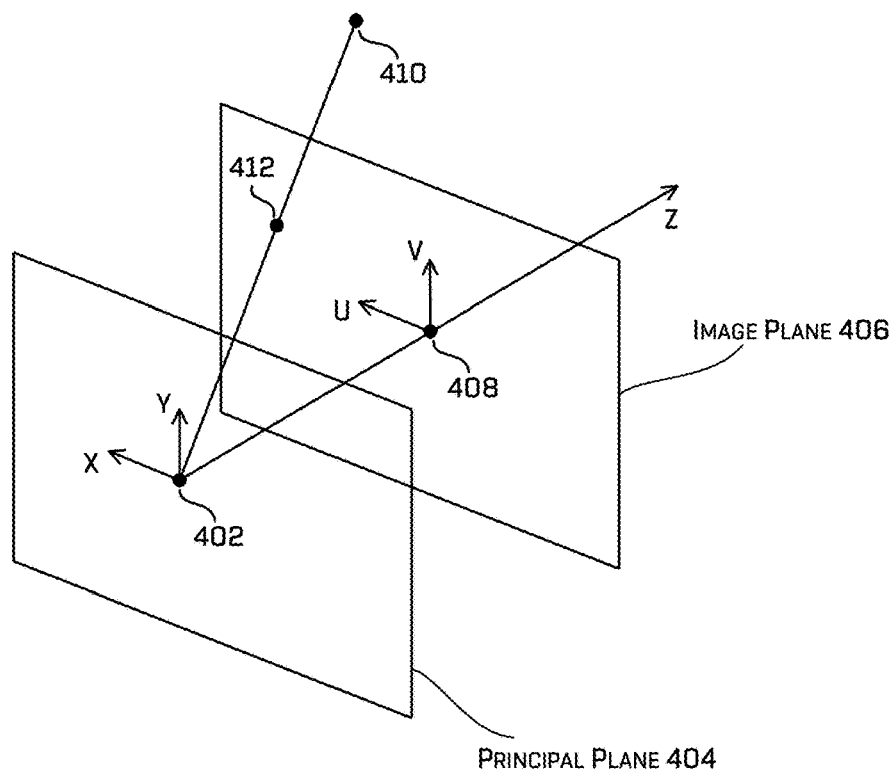
FIGS. 4A and 4B illustrate a technique for projecting a pixel from an 2D image plane into a 3D space, in accordance with one or more implementations of the disclosure.
Figure 4B:
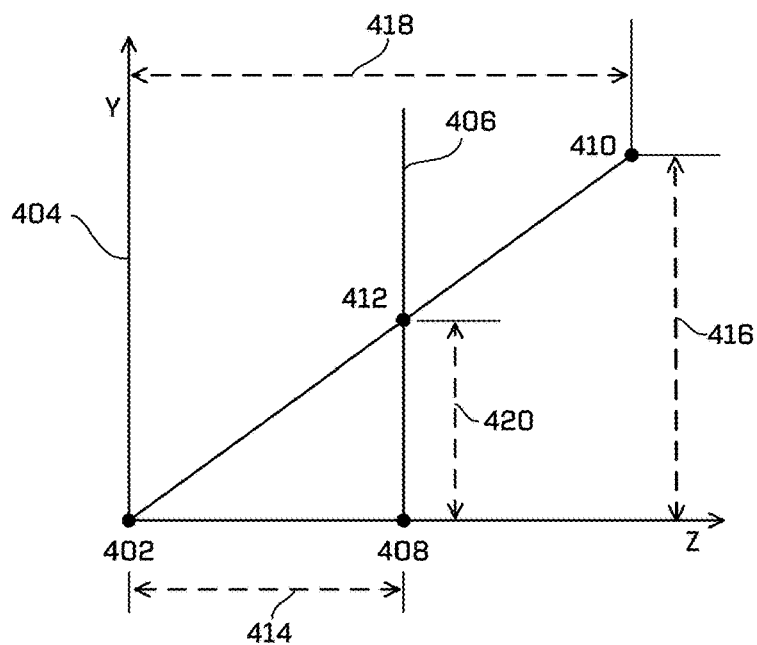

FIGS. 4A and 4B illustrate a technique for projecting a pixel from an image into a 3D space, based on the estimated depth of the pixel, the location of the pixel within the image plane, and the focal length of the camera. As noted above, when generating a 3D point cloud to represent an image 200 (or a region of interest within an image), the image-based object detector 102 may perform a set of pixel projecting operations, including an operation for each pixel within the image (or region). When one or more region of interest from an image 200 are selected (e.g., within a bounding box or instance mask for a detected object), the pixels within the region(s) of interest are included in the set of pixel projecting operations, while pixels outside of the region(s) may be excluded from the set of pixel projecting operations. In this example, FIGS. 4A and 4B represent a pixel projecting operation based on pin-hole camera geometry. However, other pixel projecting operations may be used in other examples, for instance, when projecting pixels from different types of cameras, different camera configurations, images based on multiple cameras, etc.

FIG. 4A represents a first geometric view of a camera capturing image data (e.g., image 200) of an environment. Point 402 represents the optical center of the pin-hole camera (or projection center) within the principal plane 404. The principal plane 404 is parallel to the image plane 406, and point 408 is the point within the image plane 406 along the principal axis (or optical axis), which is the line projecting out from the projection center point 402 perpendicular to the principal plane 404. The distance between point 402 and point 408 is the focal length of the camera.

The relationship between the coordinates of a point 410 in the physical environment, and the coordinates of its projection point 412 on the image plane 406 is based on central or perspective projection. FIG. 4B illustrates the use of triangles to geometrically compute the position of the point 410 in 3D space, based on the projection point 412 on the image plane 406 (or vice versa). In this example, the projection point 410 is projected into 3D space along the line containing the corresponding point 412 in the image plane 406 and the optical center (point 402). The optical center (point 402) is shown as the origin of a Euclidean coordinate system, in which the Z axis is the principal axis. As noted above, the focal length 414 is the distance between the principal plane 404 and the image plane 406. The coordinates of the point 410 in 3D space (X, Y, Z) can be mapped to the point (fX/Z,fY/Z) within the image plane 406, where f is the focal length 414, distance 416 is Y, distance 418 is Z, and distance 420 is fY/Z.

Figure 5:
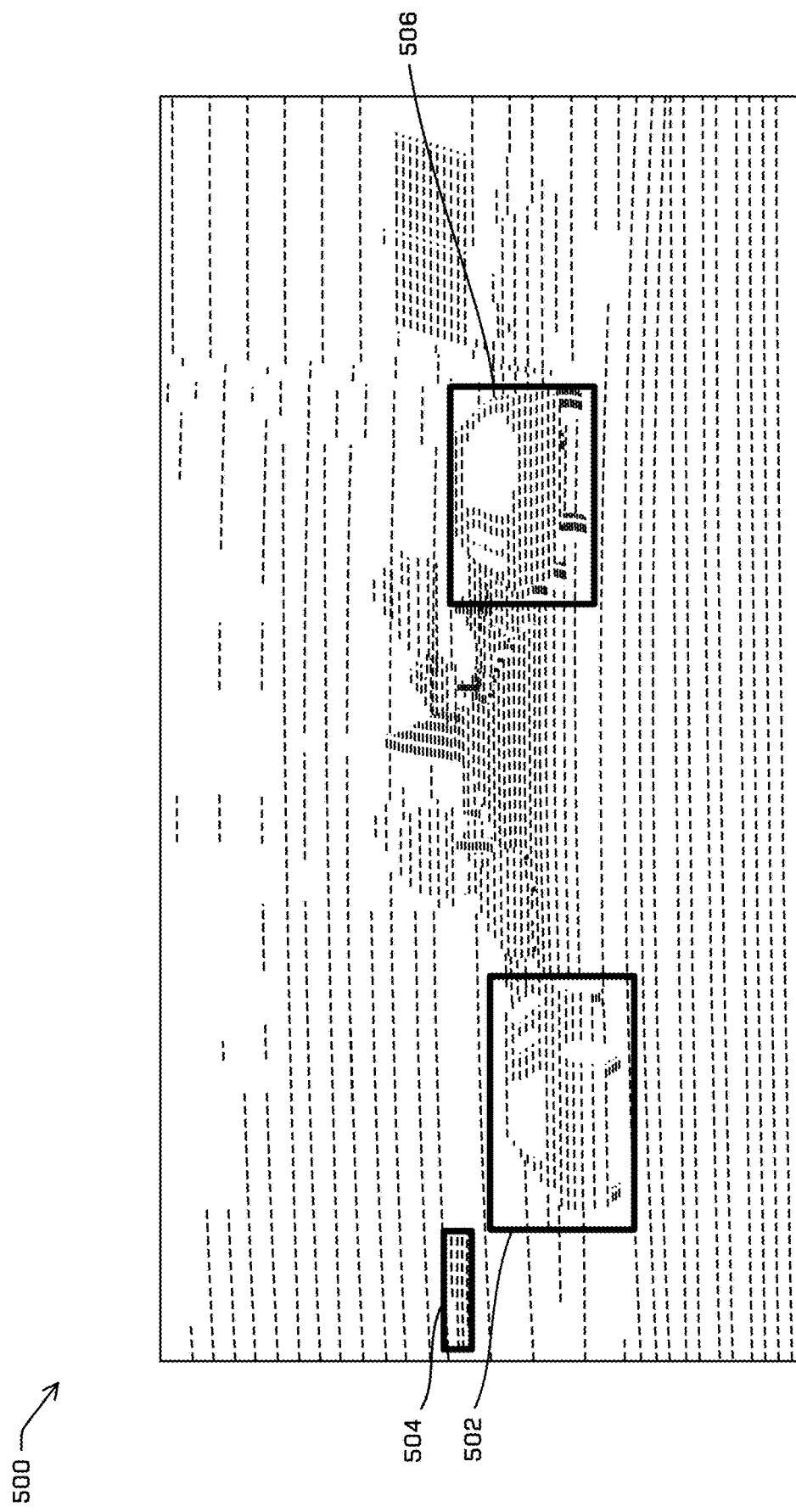
FIG. 5 illustrates a front view of an example point cloud based on 2D image data, in accordance with one or more implementations of the disclosure.

FIG. 5 shows a front view of an example point cloud 500 based on an image captured by a camera of an environment. As described above in reference to operation 112, an image-based object detector 102 may generate the point cloud 500 based on received image data, associated per-pixel depth data, and the characteristics (e.g., focal length) of the camera relative to the image plane. Each point in the point cloud 500 may be based on the output of a projection computation performed on a pixel in the original 2D image data (e.g., image 200), based on the location of the pixel in the image plane, the estimated depth of the pixel, and the focal length of the camera.

A bounding box 502, bounding box 504, and bounding box 506 are shown within the point cloud 500, each enclosing a separate object detected within the environment. For instance, for a point cloud 500 based on image 200, the bounding box 502 may be a 3D bounding box generated to enclose the object. However, point cloud 500 also may represent different image data, and bounding boxes 502-506 may be associated with different objects within a different environment. As noted above, the point cloud 500 is a 3D structure. However, in this example FIG. 5 depicts only a 2D front view (or camera-facing view) of the 3D point cloud 500. Accordingly, each of the bounding boxes 502-506 may be a 3D bounding box associated with an object detected via 3D object detection techniques, although each of the bounding boxes 502-506, although FIG. 5 shows only a 2D front-view perspective in this example.

As noted above, the image-based object detector 102 may use the point cloud 500 as input to perform various 3D object detection techniques. In some examples, the image-based object detector 102 may execute a 3D CNN configured to perform one or more object detection techniques based on the point cloud 500, and in other examples various other 3D object detection techniques may be used performed using the point cloud 500.

Figure 6:
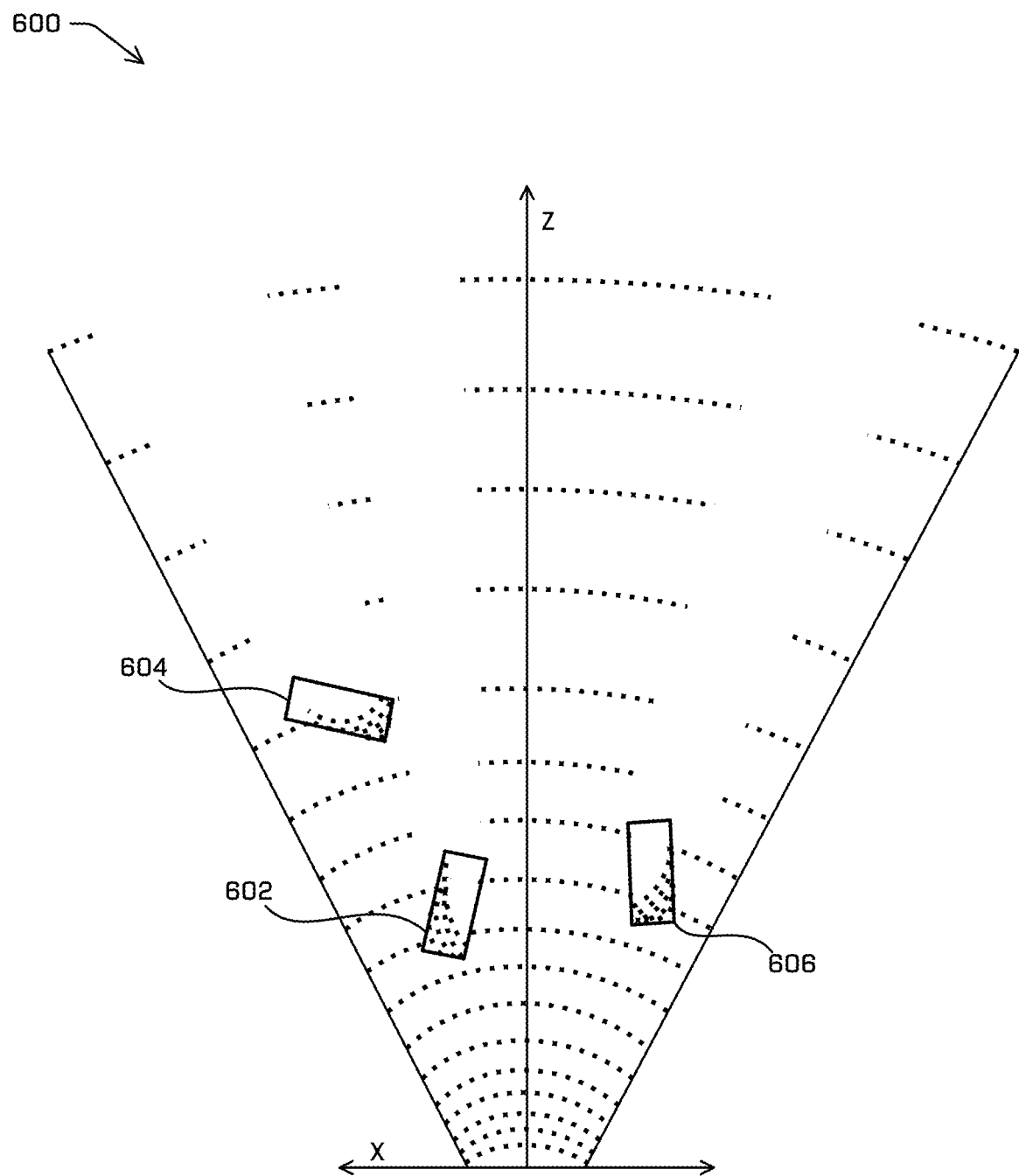
FIG. 6 illustrates a top-down view of an example point cloud based on 2D image data, in accordance with one or more implementations of the disclosure.

FIG. 6 shows a top-down view of an example point cloud 600, based on image data of an environment. In some examples, point cloud 600 may be the same as point cloud 500, where FIG. 5 shows a front view of the environment and FIG. 6 shows a top-down view of the same environment. In this case, the bounding box 602, bounding box 604, and bounding box 606 may correspond to top-down views of the same 3D bounding boxes 502-506.

As with point cloud 500, the image-based object detector 102 may use point cloud 600 as input to perform various 3D object detection techniques, such as one or more 3D CNNs trained to perform various object detection techniques. Additionally, although point cloud 600 (and/or point cloud 500) are 3D structures, the image-based object detector 102 may generate 2D views based on the 3D point clouds, by back-projecting each of the individual points in the point cloud onto a 2D image plane. Using this technique, the image-based object detector 102 may generate any number of 2D views of point cloud 114, point cloud 500, and/or 600, and may perform 2D convolutions and/or any other 2D object detection techniques on the views.

In some examples, the image-based object detector 102 may implement bounding box consistency functionality, in which a 2D bounding box determined from 2D image data, is compared to the associated 3D bounding box determined from a point cloud (e.g., point cloud 114, 500, or 600). To determine bounding box consistency, the image-based object detector 102 may store the dimensions and/or boundaries of the initial 2D bounding box generated based on the image data, and then back-project the associated 3D bounding box generated based on a point cloud (or other 3D representation) into the same 2D image plane. The size, shape, and location of the initial 2D bounding box may be compared with the size, shape, and location of the back-projected 2D bounding box. Based on the results of the comparison, a bounding box consistency metric may be determined, which can be used to evaluate the accuracy of the 3D object detection, and/or to trigger the generation of an updated 2D bounding box and/or 3D bounding box.

Figure 7:
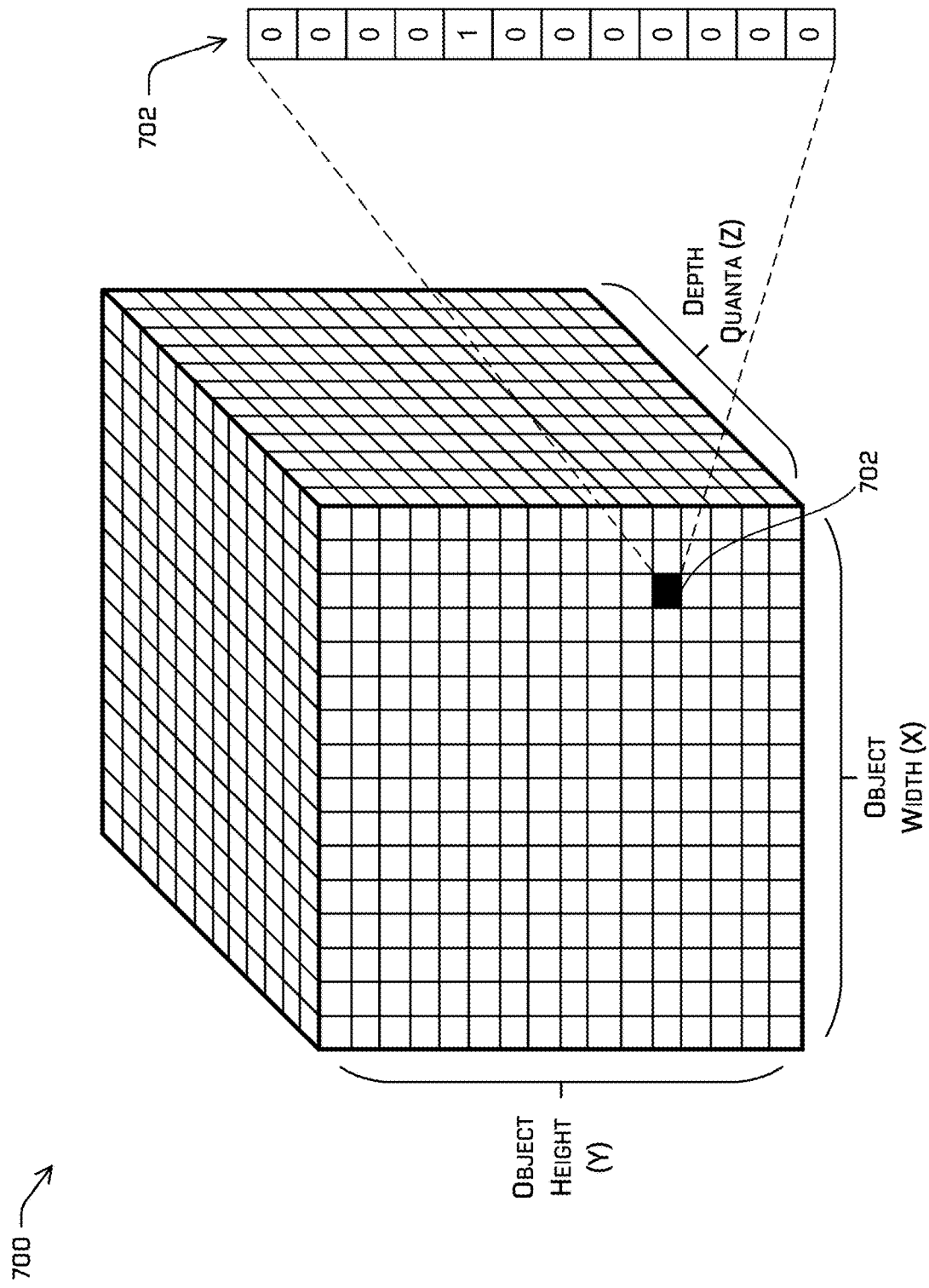
FIG. 7 is a 3D grid representation of a region of interest within 2D image data, in accordance with one or more implementations of the disclosure.

FIG. 7 shows a 3D grid 700 representing a region of interest (e.g., a 3D bounding box or instance mask) determined by the image-based object detector 102. As described above in reference to operation 112, the image-based object detector 102 may generate a 3D grid 700, in response to determining a region of interest within the image data that includes an object (e.g., a vehicle, bicycle, pedestrian, etc.), using a 2D object detection technique. Additionally or alternatively, image-based object detector 102 may voxelize a portion of a point cloud 114 to generate a 2D or 3D spatial representation of a particular object within the environment, or the environment itself. As noted above, for generating a 2D or 3D grid representing one or more objects in the environment, the image-based object detector 102 also may quantize the estimated depth data into bins based on predetermined depth ranges. As shown in this example, the 3D grid 700 may be generated using the width and height dimensions of the detected object, and using a depth dimension based on a predetermined number of depth quanta ranges. In this example, the object detected in the 2D image data is 16 pixels by 16 pixels, and the image-based object detector 102 uses 12 depth quanta corresponding to 12 distinct depth ranges. For each of the 256 pixels in the 2D region of interest, the image-based object detector 102 determines a depth quanta for the pixel, by comparing the estimated depth data for that pixel to the 12 predetermined depth ranges. As illustrated for pixel 702, the 3D grid 700 may include, for each pixel in the 2D region of interest, a bit for each depth quanta. One of the depth quanta bits may be set to one (1) to indicate that the estimated depth data for the pixel is within the associated depth range for the depth quanta, and the other bits may be set to zero (0).

In various implementations, a 3D grid 700 may be generated by the image-based object detector 102 instead of, or in addition to a point cloud such as point clouds 114, 500, and 600. In some cases, a 3D grid 700 may be generated instead of a point cloud, which may provide additional efficiency and reduce processing overhead, because pixel projection computations are not required to generate the 3D grid 700. The image-based object detector 102 may perform a number of 2D and/or 3D object detection techniques using a 3D grid 700, including any of the 3D object detection techniques described above which may be performed on point clouds, and/or 2D convolutions performed within deep learning techniques. The image-based object detector 102 may, for example, perform 2D convolutions on a front view, side view, and/or top-down view of the 3D grid 700. In some cases, performing 2D convolutions on a top-down view of the 3D grid 700 may provide particular advantages, because the top-down view may provide greater spatial continuity of the pixel values than either the side view or front view, thus allowing for more effective feature extraction and/or object detection.

Figure 8:
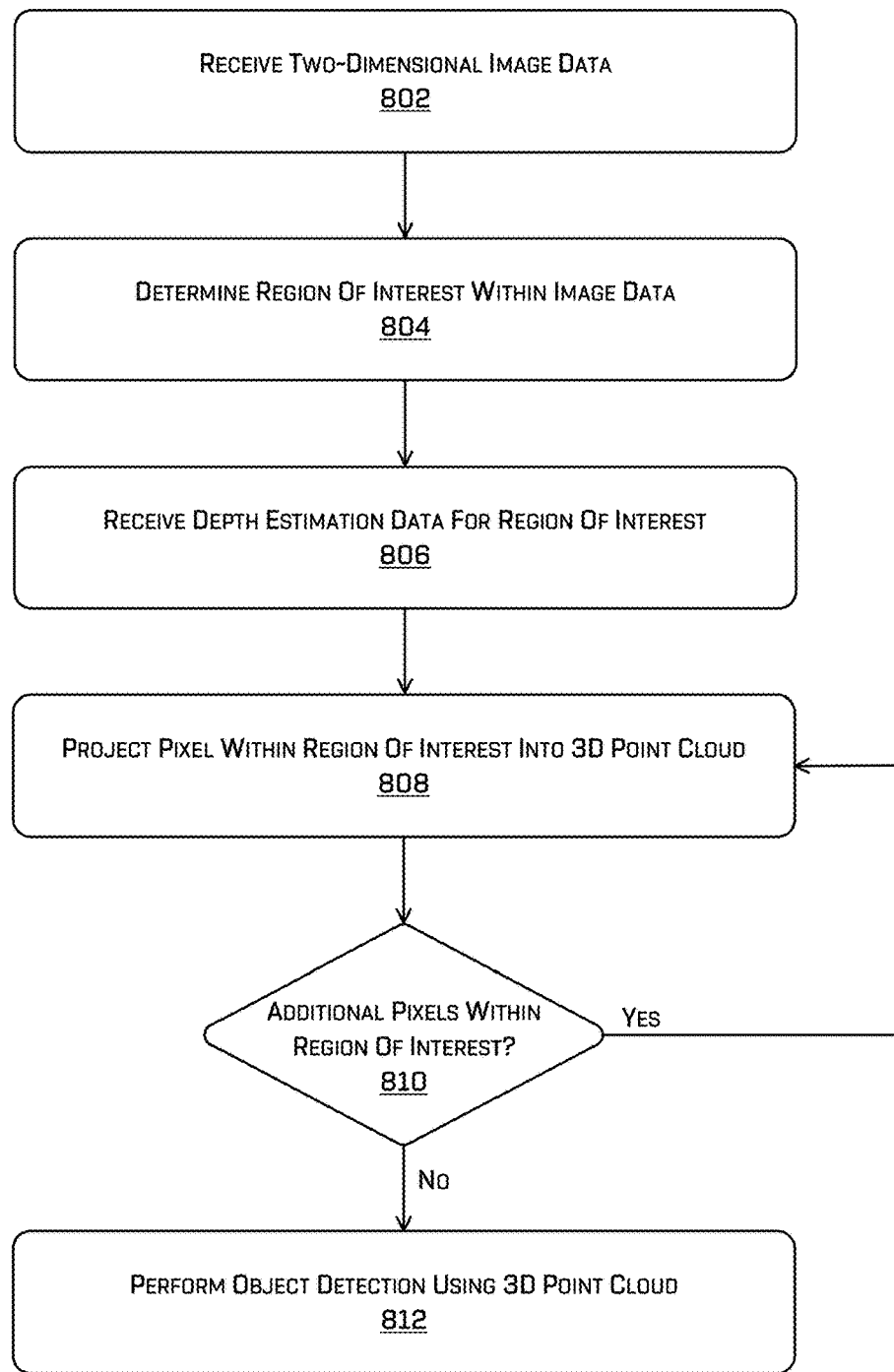
FIG. 8 is a flow diagram illustrating an example process of generating a point cloud based on 2D image data and associated depth data, and performing 3D object detection techniques using the point cloud, in accordance with one or more implementations of the disclosure.
Figure 9:
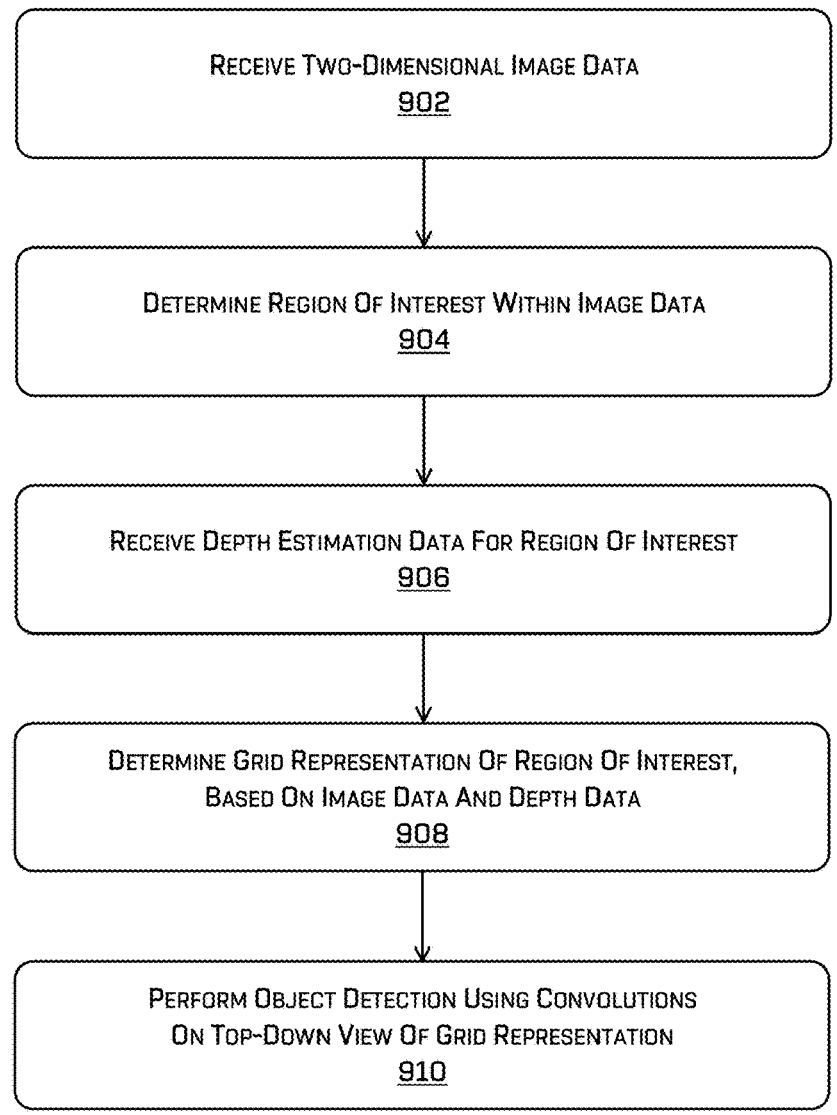
FIG. 9 is a flow diagram illustrating an example process of generating a 3D grid representation based on 2D image data and associated depth data, and performing object detection techniques using the 3D grid, in accordance with one or more implementations of the disclosure.

FIG. 8 illustrates an example process 800 of performing 3D object detection techniques based on a point cloud generated from image data, and FIG. 9 illustrates an example process 900 of performing object detection based on image data using a 3D grid representation. As described below, process 800 and/or process 900 may be performed by one or more computer-based components configured to implement the functionality of an image-based object detector 102. In some examples, an image-based object detector 102 may be implemented within an autonomous vehicle, and processes 800 and/or 900 may be used to detect, classify, and track objects within the environment of the autonomous vehicle. In these examples, the components of the autonomous vehicle (e.g., perception, prediction, planning, localization, etc.) may use outputs from processes 800 and/or 900 to control the autonomous vehicle. Controlling the autonomous vehicle based on the object detection outputs from processes 800 and/or 900 may include, for example, generate a trajectory for traversing an environment, activating a secondary vehicle controller, controlling a remote teleoperations computing device, engaging or disengaging autonomous driving features, and the like. In still other examples, an image-based object detector 102 may be integrated into other types of moving vehicles, mobile devices, image analysis systems, security and surveillance systems, and/or other computer-based systems configured to perform image-based object detection.

Process 800 and process 900 are illustrated as collections of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types. The order in which the operations are described should not be construed as a limitation. Any number of the described blocks can be combined in any order and/or in parallel to implement the processes, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

In process 800, an image-based object detector 102 may be configured to generate a 3D point cloud based on 2D image data and associated depth data, and to perform 3D object detection techniques using the point cloud. At operation 802, the image-based object detector 102 receives 2D image data representing an environment. In some examples, the 2D image data may include data captured by a camera of an autonomous vehicle traversing an environment. The 2D image data may include representations of various static and dynamic objects within the environment, including but not limited to other vehicles, cyclists, pedestrians, buildings, road features, traffic signs, signals, etc.

At operation 804, the image-based object detector 102 may perform 2D object detection to determine one or more regions of interest within the image data. For instance, the image-based object detector 102 may execute one or more 2D object detection and/or instance segmentation algorithms (or models and/or network) on the 2D image data, to identify the presence of various objects of interest within the environment. An object of interest may include, for example, another vehicle, bicycle, pedestrian, etc. In response to detecting an object of interest, the image-based object detector 102 may determine an associated 2D region of interest, such as bounding box or an instance mask, that encloses the object.

At operation 806, the image-based object detector 102 receives depth estimation data for the region(s) of interest determined in operation 804. The depth estimation data received in operation 806 may include per-pixel estimated depth values, for each pixel within the region(s) of interest in the 2D image data. In some examples, the image-based object detector 102 need not determine particular regions of interest, and may receive depth data and generate a 3D point cloud representing an entire image. Receiving depth estimation data in operation 806 may include, in some cases, executing one or more image-based depth data estimation techniques, including but not limited to the depth estimation algorithms, trained models and/or neural networks described above in operation 108.

At operations 808 and 810, the image-based object detector 102 may perform a processing loop configured to project each pixel within a region of interest in the 2D image data, into a 3D point cloud. In some examples, the image-based object detector 102 may execute a discreet pixel projection calculation for each pixel within the region(s) of interest of the 2D image data. A pixel projection calculations may determine a location for the pixel in 3D space, based at least in part on the location of the pixel within the image plane of the 2D image, the estimated depth data for the pixel, and the focal length of the camera. Although pixel projection calculations may be performed individually, in various implementations they may be performed in serial and/or in parallel in an iterative processing loop for each additional pixels within the region(s) of interest (810:Yes). When all pixels within region(s) of interest have been projected in the 3D point cloud (810:No), the process may continue to operation 812 and the remaining pixels in the 2D image data may be excluded from the pixel projecting calculations.

At operation 812, the image-based object detector 102 performs one or more 3D object detection algorithms, based on the 3D point cloud generated in operations 808-810. In some examples, the image-based 3D point cloud may be provided as input to one or more algorithms, trained models, and/or networks (e.g., 3D CNNs) configured to perform various object detection functionality. The algorithms, trained models, and/or networks that receive the image-based point cloud may, in some instances, be designed to receive and process lidar or radar point clouds. As noted above, the 3D object detection techniques performed in operation 812 can include various combinations of object detection and/or image-based analyses, including but not limited to object detection/identification, object classification, instance segmentation, semantic segmentation, object tracking, feature extraction, and/or transformation.

In process 900, an image-based object detector 102 may be configured to generate a 3D grid representation based on 2D image data and associated depth data, and to perform object detection techniques using the 3D grid representation. At operation 902, the image-based object detector 102 may receive 2D image data representing an environment. Operation 902 may be similar or identical to operation 802, described above. For example, the image-based object detector 102 may receive 2D image data captured by a camera, including representations of various static and/or dynamic objects within an environment.

At operation 904, the image-based object detector 102 may perform 2D object detection to determine region(s) of interest within the image data. Operation 904 may be similar or identical to operation 804, described above. For instance, the image-based object detector 102 may execute one or more 2D object detection techniques on the 2D image data, to identify various objects of interest, and may determine an associated 2D region of interest (e.g., a bounding box or instance mask) associated with the object.

At operation 906, the image-based object detector 102 may receive depth estimation data associated with the image data received in operation 902, and/or the particular region(s) of the image data determined in operation 904. Operation 906 may be similar or identical to operation 806, described above. For instance, the image-based object detector 102 may receive per-pixel depth estimation values, and/or may execute depth data estimation techniques, including but not limited to the depth estimation algorithms, trained models and/or neural networks described above in operation 108.

At operation 908, the image-based object detector 102 may determine a grid representation of a portion of the environment, which may correspond to the entire 2D image received in operation 902 and/or to one or more particular regions of interest determined in operation 904. In some examples, image-based object detector 102 may generate a 2D or 3D grid representation, based on the 2D image data and the associated depth data. Additionally or alternatively, the image-based object detector 102 may determine 2D or 3D representations without generating a grid, based on a combination of visual data (e.g., RGB data) for each pixel in the 2D image data, and using the associated per-pixel depth data as a separate depth dimension, which may be quantized into predetermined quanta based on predetermined depth ranges. As noted above, generating a 3D grid representation in operation 908 may be performed without projecting any of the pixels into a point cloud or other 3D space. Rather, some examples, the image-based object detector 102 may generate a 3D grid structure having width and height dimensions based on the pixel width and height of the region(s) of interest, and having a depth dimension based on the predetermined number of depth quanta ranges. Each per-pixel depth estimate may be quantized (or binned) into one of the predetermined depth quanta, which may correspond to increasing depth ranges.

At operation 910, the image-based object detector 102 may perform one or more object detection techniques (e.g., algorithms, trained models, neural networks, etc.) based on the grid representation generated in operations 908. In some examples, the image-based object detector 102 may perform 2D or 3D convolutions on a top-down view of the grid representation, thereby providing improved feature extraction and/or object detection. In various other examples, the 3D grid representation may be used as input for any of the object detection techniques described herein, including any combination of the 2D or 3D object detection algorithms, trained models, and/or neural networks (e.g., 3D CNNs or other feedforward neural networks).

Figure 10:
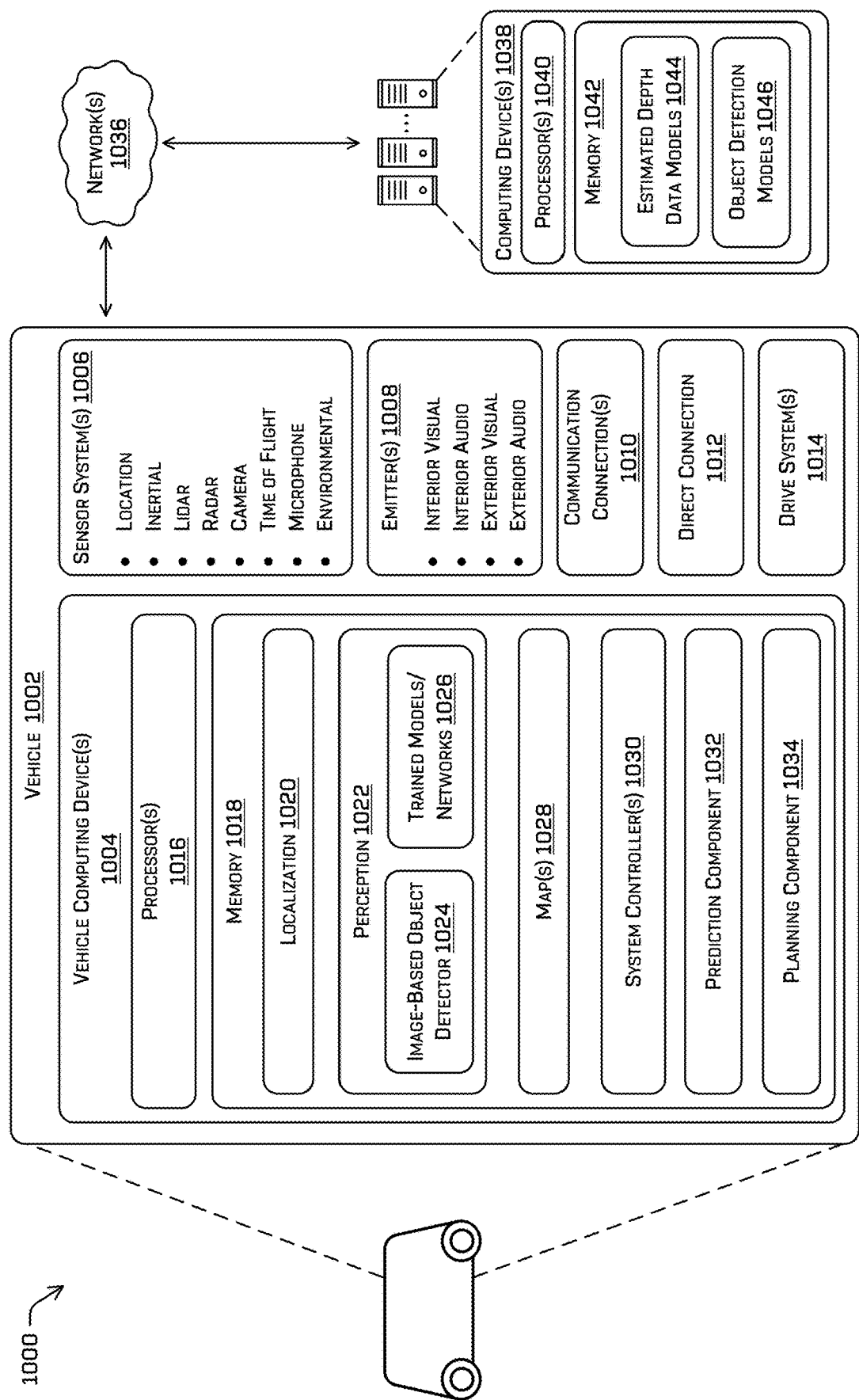
FIG. 10 depicts a block diagram of an example system for implementing various techniques described herein.

FIG. 10 depicts a block diagram of an example system 1000 for implementing various techniques described herein. In at least one example, the system 1000 can include a vehicle 1002, which can correspond to an autonomous or semi-autonomous vehicle configured to perform object perception and prediction functionality, route planning and/or optimization. The vehicle 1002 may include components configured to perform image-based 3D object detection, as described in the above examples, as well as controlling the vehicle and route planning based on the object detection. The example vehicle 1002 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 1002 can be configured to control all functions from start to completion of the trip, including all parking functions, it may not include a driver and/or controls for driving the vehicle 1002, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

In this example, the vehicle 1002 can include vehicle computing device(s) 1004, one or more sensor systems 1006, one or more emitters 1008, one or more communication connections 1010, at least one direct connection 1012, and one or more drive systems 1014.

The vehicle computing device(s) 1004 can include one or more processors 1016 and memory 1018 communicatively coupled with the one or more processors 1016. In the illustrated example, the vehicle 1002 is an autonomous vehicle; however, the vehicle 1002 could be any other type of vehicle or robotic platform. In the illustrated example, the memory 1018 of the vehicle computing device(s) 1004 stores a localization component 1020, a perception component 1022, an image-based object detector 1024, one or more trained models/networks 1026, one or more maps 1028, one or more system controllers 1030, a prediction component 1032, and a planning component 1034. Though depicted in FIG. 10 as residing in the memory 1018 for illustrative purposes, one or more of the localization component 1020, the perception component 1022, the image-based object detector 1024, the trained models/networks 1026, the maps 1028, the system controllers 1030, the prediction component 1032, and the planning component 1034 can additionally, or alternatively, be accessible to the vehicle 1002 (e.g., stored on, or otherwise accessible by, memory remote from the vehicle 1002).

In at least one example, the localization component 1020 can include functionality to receive data from the sensor system(s) 1006 to determine a position and/or orientation of the vehicle 1002 (e.g., one or more of an x-, y-, z-position, roll, pitch, or yaw). For example, the localization component 1020 can include and/or request/receive a map of an environment and can continuously determine a location and/or orientation of the autonomous vehicle within the map. In some instances, the localization component 1020 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 1020 can provide data to various components of the vehicle 1002 to determine an initial position of an autonomous vehicle for generating a trajectory and/or for determining that an object is proximate to one or more crosswalk regions and/or for identifying candidate reference lines, as discussed herein.

In some instances, and in general, the perception component 1022 can include functionality to perform object detection, segmentation, and/or classification. In some examples, the perception component 1022 can provide processed sensor data that indicates a presence of an entity that is proximate to the vehicle 1002 and/or a classification of the entity as an entity type (e.g., car, pedestrian, cyclist, animal, building, tree, road surface, curb, sidewalk, stoplight, stop sign, unknown, etc.). In additional or alternative examples, the perception component 1022 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As shown in this example, the perception component 1022 can include an image-based object detector 1024 and one or more trained models/networks 1026. The image-based object detector 1024 may the perform similar or identical functionality to the image-based object detector 102 described above. For example, the image-based object detector 1024 may be configured to receive 2D image data captured by image sensors (e.g., cameras) of the autonomous vehicle 1002, receive and/or determine associated depth data, and generate 3D representations based on the 2D image data and associated depth data. As described above, the 3D representations may include point clouds based on the 2D image data and pixel depth estimations, and/or 3D grid representations of one or more regions an environments. The image-based object detector 1024 may use the 3D representations to execute one or more trained models/networks 1026, to perform object detection functionality including object detection, semantic segmentation, and/or instance segmentation. As described above, the trained models/networks 1026 can include, among other examples, trained 3D convolutional neural networks configured to receive 3D point clouds, and/or deep learning techniques based on 2D convolutions.

The memory 1018 can further include one or more maps 1028 that can be used by the vehicle 1002 to navigate within the environment. For the purpose of this disclosure, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., vectorized information regarding features of an environment, image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 1028 can include at least one map (e.g., images and/or a mesh).

In some examples, the vehicle 1002 can be controlled based at least in part on the maps 1028. That is, the maps 1028 can be used in connection with the localization component 1020, the perception component 1022, the prediction component 1032, and/or the planning component 1034 to determine a location of the vehicle 1002, identify objects in an environment, and/or generate routes and/or trajectories to navigate within an environment. In some examples, the one or more maps 1028 can be stored on a remote computing device(s), such as within the memory 1042 of the computing device(s) 1038, and may be accessible to the vehicle 1002 via network(s) 1036. In some examples, multiple maps 1028 can be retrieved from the memory 1042, and stored based on, for example, a characteristic (e.g., type of entity, time of day, day of week, season of the year, etc.). Storing multiple maps 1028 can have similar memory requirements, but can increase the speed at which data in a map can be accessed.

In at least one example, the vehicle computing device(s) 1004 can include one or more system controllers 1030, which can be configured to control steering, propulsion, braking, safety, emitters, communication, and other systems of the vehicle 1002. These system controller(s) 1030 can communicate with and/or control corresponding systems of the drive system(s) 1014 and/or other components of the vehicle 1002. For example, the planning component 1034 may generate instructions based at least in part on perception data generated by the perception component 1022 (which may comprise any of the image-based point clouds and/or 3D grid representations discussed herein) and transmit the instructions to the system controller(s) 1030, which may control operation of the vehicle 1002 based at least in part on the instructions. In some examples, if the planning component 1034 receives a notification that a track of an object was "lost" (e.g., an object no longer appears in perception data and isn't occluded by any other objects), the planning component 1034 may generate an instruction to bring the vehicle 1002 to a safe stop and/or to transmit a request for teleoperator assistance.

In general, the prediction component 1032 can include functionality to generate predicted information associated with objects in an environment. As an example, the prediction component 1032 can be implemented to predict locations of a pedestrian proximate to a crosswalk region (or otherwise a region or location associated with a pedestrian crossing a road) in an environment as they traverse or prepare to traverse through the crosswalk region. As another example, the techniques discussed herein can be implemented to predict locations of other objects (e.g., vehicles, bicycles, pedestrians, and the like) as the vehicle 1002 traverses an environment. In some examples, the prediction component 1032 can generate one or more predicted positions, predicted velocities, predicted trajectories, etc., for such target objects based on attributes of the target object and/or other objects proximate the target object.

In general, the planning component 1034 can determine a path for the vehicle 1002 to follow to traverse the environment. The planning component 934 can include functionality to determine various routes and trajectories and various levels of detail. For example, the planning component 1034 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 1034 can generate an instruction for guiding the autonomous vehicle along at least a portion of the route from the first location to the second location. In at least one example, the planning component 1034 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1002 to navigate.

In some instances, the planning component 1034 can generate one or more trajectories for the vehicle 1002 based at least in part on predicted location(s) associated with object(s) in an environment. In some examples, the planning component 1034 can use temporal logic, such as linear temporal logic and/or signal temporal logic, to evaluate one or more trajectories of the vehicle 1002.

As can be understood, the components discussed herein (e.g., the localization component 1020, the perception component 1022, the one or more maps 1028, the one or more system controllers 1030, the prediction component 1032, and the planning component 1034) are described as divided for illustrative purposes. However, the operations performed by the various components can be combined or performed in any other component. Further, any of the components discussed as being implemented in software can be implemented in hardware, and vice versa. Further, any functionality implemented in the vehicle 1002 can be implemented in the computing device(s) 1038, or another component (and vice versa).

In at least one example, the sensor system(s) 1006 can include time of flight sensors, lidar sensors, radar devices and/or radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 1006 can include multiple instances of each of these or other types of sensors. For instance, the time of flight sensors can include individual time of flight sensors located at the corners, front, back, sides, and/or top of the vehicle 1002. As another example, the camera sensors can include multiple cameras disposed at various locations about the exterior and/or interior of the vehicle 1002. The sensor system(s) 1006 can provide input to the vehicle computing device(s) 1004. Additionally or alternatively, the sensor system(s) 1006 can send sensor data, via the one or more networks 1036, to the one or more computing device(s) 1038 at a particular frequency, after a lapse of a predetermined period of time, in near real-time, etc.

The vehicle 1002 can also include one or more emitters 1008 for emitting light and/or sound, as described above. The emitters 1008 in this example include interior audio and visual emitters to communicate with passengers of the vehicle 1002. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1008 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1002 can also include one or more communication connection(s) 1010 that enable communication between the vehicle 1002 and one or more other local or remote computing device(s). For instance, the communication connection(s) 1010 can facilitate communication with other local computing device(s) on the vehicle 1002 and/or the drive system(s) 1014. Also, the communication connection(s) 1010 can allow the vehicle to communicate with other nearby computing device(s) (e.g., other nearby vehicles, traffic signals, etc.). The communications connection(s) 1010 also enable the vehicle 1002 to communicate with a remote teleoperations computing device or other remote services.

The communications connection(s) 1010 can include physical and/or logical interfaces for connecting the vehicle computing device(s) 1004 to another computing device or a network, such as network(s) 1036. For example, the communications connection(s) 1010 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 1002 can include one or more drive systems 1014. The vehicle 1002 can have a single drive system 1014, or multiple drive systems 1014. In at least one example, if the vehicle 1002 has multiple drive systems 1014, individual drive systems 1014 can be positioned on opposite ends of the vehicle 1002 (e.g., the front and the rear, etc.). In at least one example, the drive system(s) 1014 can include one or more sensor systems to detect conditions of the drive system(s) 1014 and/or the surroundings of the vehicle 1002. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 1014. In some cases, the sensor system(s) on the drive system(s) 1014 can overlap or supplement corresponding systems of the vehicle 1002 (e.g., sensor system(s) 1006).

The drive system(s) 1014 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1014 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 1014. Furthermore, the drive system(s) 1014 also include one or more communication connection(s) that enable communication by the respective drive system with one or more other local or remote computing device(s).

In at least one example, the direct connection 1012 can provide a physical interface to couple the one or more drive system(s) 1014 with the body of the vehicle 1002. For example, the direct connection 1012 can allow the transfer of energy, fluids, air, data, etc. between the drive system(s) 1014 and the vehicle. In some instances, the direct connection 1012 can further releasably secure the drive system(s) 1014 to the body of the vehicle 1002.

In at least one example, the localization component 1020, the perception component 1022, the image-based object detector 1024, the trained models/networks 1026, the one or more maps 1028, the one or more system controllers 1030, the prediction component 1032, and the planning component 1034 can process sensor data, as described above, and can send their respective outputs, over the one or more network(s) 1036, to one or more computing device(s) 1038. In at least one example, the respective outputs of the components can be transmitted the one or more computing device(s) 1038 at a particular frequency, after a lapse of a predetermined period of time, in near real-time, etc. Additionally or alternatively, the vehicle 1002 can send sensor data to one or more computing device(s) 1038 via the network(s) 1036, including raw sensor data, processed sensor data and/or representations of sensor data. Such sensor data can be sent as one or more log files to the computing device(s) 1038 at a particular frequency, after a lapse of a predetermined period of time, in near real-time, etc.

The computing device(s) 1038 can include processor(s) 1040 and a memory 1042 storing one or more estimated depth data models 1044 and/or object detection models 1046. As described above, the estimated depth data models 1044 may include one or more trained neural networks, machine-learned models, and/or other heuristics-based algorithms configured to determine estimated depth data for individual regions (e.g., pixels) in an image. The object detection models 1046 may include one or more trained neural networks, machine-learned models, and/or other heuristics-based algorithms configured to perform object detection and object categorization/classification (e.g., instance segmentation and/or semantic segmentation), based on 2D and/or 3D data representing individual regions of interest or an environment as a whole. In various examples, the computing devices 1038 may implement one or more machine learning systems or heuristics-based systems to train, test, and optimize the estimated depth data models 1044 and/or object detection models 1046, based on log data received from vehicle 1002 and/or additional vehicles operating within environments. Additionally, any of the features or functionalities described in connection with the image-based object detector 1024 (e.g., generating point clouds based on 2D image data and associated depth data, generating 3D grid representations using predetermined depth quanta, performing object detection, etc.) also may be performed by computing devices 1038 using heuristics-based techniques and/or neural network models and algorithms. In this example, neural networks are algorithms which pass input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters. Any type of machine learning can be used consistent with this disclosure.

The processor(s) 1016 of the vehicle 1002 and the processor(s) 1040 of the computing device(s) 1038 can be any suitable processor capable of executing instructions to process data and perform operations as described herein. By way of example and not limitation, the processor(s) 1016 and 1040 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1018 and 1042 are examples of non-transitory computer-readable media. The memory 1018 and 1042 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 10 is illustrated as a distributed system, in alternative examples, components of the vehicle 1002 can be associated with the computing device(s) 1038 and/or components of the computing device(s) 1038 can be associated with the vehicle 1002. That is, the vehicle 1002 can perform one or more of the functions associated with the computing device(s) 1038, and vice versa.

EXAMPLE CLAUSES

A. A system comprising: one or more processors; and one or more non-transitory computer-readable media storing computer-executable instructions that, when executed, cause the system to perform operations comprising: receiving two-dimensional image data captured by a camera in an environment, the two-dimensional image data including a first pixel and a second pixel; determining, based at least in part on an output of a depth estimation algorithm, first estimated depth data associated with the first pixel and second estimated depth data associated with the second pixel, wherein the first estimated depth data is different from the second estimated depth data; projecting the first pixel as a first point into a three-dimensional space, based at least in part on the first estimated depth data; projecting the second pixel as a second point into the three-dimensional space, based at least in part on the second estimated depth data; generating a point cloud associated with the two-dimensional image data, the point cloud including the first point and the second point; providing the point cloud to a three-dimensional object detection algorithm; and determining an object in the environment, based at least in part on an output of the three-dimensional object detection algorithm.

B. The system as recited in paragraph A, the operations further comprising: performing a two-dimensional object detection algorithm on the two-dimensional image data; and determining that the first pixel and the second pixel are associated with an object, based at least in part on the two-dimensional object detection algorithm, wherein projecting the first pixel and the second pixel is based at least in part on determining that the first pixel and the second pixel are associated with the object.

C. The system as recited in paragraph B, the operations further comprising: determining a first portion of the two-dimensional image data associated with the object, wherein the first portion includes the first pixel and the second pixel; determining that a third pixel of the two-dimensional image data is outside of the first portion associated with the object; and excluding the third pixel from a projecting operation, based at least in part on determining that the third pixel is outside of the first portion of the two-dimensional image data.

D. The system as recited in paragraph A, the operations further comprising: quantizing the first estimated depth data into a first predetermined depth quanta, before projecting the first pixel; and quantizing the second estimated depth data into a second predetermined depth quanta, before projecting the second pixel.

E. The system as recited in paragraph A, the operations further comprising: determining a first two-dimensional bounding box within a two-dimensional image plane associated with the two-dimensional image data; determining a three-dimensional bounding box, based at least in part on the point cloud; determining a second two-dimensional bounding box, by projecting the three-dimensional bounding box into the two-dimensional image plane; and modifying the three-dimensional bounding box, based at least in part on comparing the first two-dimensional bounding box and the second two-dimensional bounding box.

F. A method comprising: receiving two-dimensional image data captured by a camera, the two-dimensional image data including a first pixel and a second pixel; receiving first depth data associated with the first pixel and second depth data associated with the second pixel, wherein the first depth data is different from the second depth data; projecting the first pixel as a first point into a three-dimensional space, based at least in part on the first depth data;

projecting the second pixel as a second point into the three-dimensional space, based at least in part on the second depth data; and generating a point cloud associated with the two-dimensional image data, the point cloud including the first point and the second point.

G. The method of paragraph F, further comprising: providing the point cloud to a three-dimensional object detection algorithm; and determining an object within the two-dimensional image data, based at least in part on an output of the three-dimensional object detection algorithm.

H. The method of paragraph F, further comprising: performing a two-dimensional object detection algorithm on the two-dimensional image data; and determining that the first pixel and the second pixel are associated with an object, based at least in part on the two-dimensional object detection algorithm, wherein projecting the first pixel and the second pixel is based at least in part on determining that the first pixel and the second pixel are associated with the object.

I. The method of paragraph H, further comprising: determining a first portion of the two-dimensional image data associated with the object, wherein the first portion includes the first pixel and the second pixel; determining that a third pixel of the two-dimensional image data is outside of the first portion associated with the object; and excluding the third pixel from a projecting operation, based at least in part on determining that the third pixel is outside of the first portion of the two-dimensional image data.

J. The method of paragraph F, wherein receiving the first depth data and the second depth data comprises: providing the two-dimensional image data to a model trained to determine estimated depth data based on image input data; receiving an output from the model; and determining the first depth data and the second depth data based at least in part on the output of the model.

K. The method of paragraph F, further comprising: quantizing the first depth data into a first predetermined depth quanta, before projecting the first pixel; and quantizing the second depth data into a second predetermined depth quanta, before projecting the second pixel.

L. The method of paragraph F, wherein projecting the first pixel and the second pixel into the three-dimensional space, is based at least in part on a focal length of the camera.

M. The method of paragraph F, further comprising: determining a first two-dimensional bounding box within a two-dimensional image plane associated with the two-dimensional image data; determining a three-dimensional bounding box, based at least in part on the point cloud; determining a second two-dimensional bounding box, by projecting the three-dimensional bounding box into the two-dimensional image plane; and modifying the three-dimensional bounding box, based at least in part on comparing the first two-dimensional bounding box and the second two-dimensional bounding box.

N. One or more non-transitory computer-readable media storing processor-executable instructions that, when executed by one or more processors, cause the one or more processors to perform operations comprising: receiving two-dimensional image data captured by a camera, the two-dimensional image data including a first pixel and a second pixel; receiving first depth data associated with the first pixel and second depth data associated with the second pixel, wherein the first depth data is different from the second depth data; projecting the first pixel as a first point into a three-dimensional space, based at least in part on the first depth data; projecting the second pixel as a second point into the three-dimensional space, based at least in part on the second depth data; and generating a point cloud associated with the two-dimensional image data, the point cloud including the first point and the second point.

O. The one or more non-transitory computer-readable media of paragraph N, the operations further comprising: providing the point cloud to a three-dimensional object detection algorithm; and determining an object type associated with the first pixel, based at least in part on an output of the three-dimensional object detection algorithm.

P. The one or more non-transitory computer-readable media of paragraph N, the operations further comprising: performing a two-dimensional object detection algorithm on the two-dimensional image data; and determining that the first pixel and the second pixel are associated with an object, based at least in part on the two-dimensional object detection algorithm, wherein projecting the first pixel and the second pixel is based at least in part on determining that the first pixel and the second pixel are associated with the object.

Q. The one or more non-transitory computer-readable media of paragraph P, the operations further comprising: determining a first portion of the two-dimensional image data associated with the object, wherein the first portion includes the first pixel and the second pixel; determining that a third pixel of the two-dimensional image data is outside of the first portion associated with the object; and excluding the third pixel from a projecting operation, based at least in part on determining that the third pixel is outside of the first portion of the two-dimensional image data.

R. The one or more non-transitory computer-readable media of paragraph N, wherein receiving the first depth data and the second depth data comprises: providing the two-dimensional image data to a model trained to determine estimated depth data based on image input data; receiving an output from the model; and determining the first depth data and the second depth data based at least in part on the output of the model.

S. The one or more non-transitory computer-readable media of paragraph N, the operations further comprising: quantizing the first depth data into a first predetermined depth quanta, before projecting the first pixel; and quantizing the second depth data into a second predetermined depth quanta, before projecting the second pixel.

T. The one or more non-transitory computer-readable media of paragraph N, wherein projecting the first pixel and the second pixel into the three-dimensional space, is based at least in part on a focal length of the camera.

U. A system comprising: one or more processors; and one or more non-transitory computer-readable media storing computer-executable instructions that, when executed, cause the system to perform operations comprising: receiving two-dimensional image data representing an environment; determining, based at least in part on a two-dimensional object detection algorithm, a region of the two-dimensional image data associated with an object in the environment, wherein the region includes a first pixel and a second pixel; receiving depth data associated with the two-dimensional image data, the depth data including first depth data associated with the first pixel and second depth data associated with the second pixel, wherein the first depth data is different from the second depth data; quantizing the depth data; determining top-down scene data associated with the environment, based at least in part on the two-dimensional image data and the quantized depth data; and performing a two-dimensional convolution operation on the top-down scene data, wherein one of the dimensions corresponds to depth data.

V. The system of paragraph U, wherein determining the top-down scene data comprises: quantizing the first depth data into a first depth quanta; and quantizing the second depth data into a second depth quanta, wherein the first depth quanta is different from the second depth quanta.

W. The system of paragraph V, wherein the first depth quanta is associated with a first range of depth data values, and the second depth quanta is associated with a second range of depth data values different from the first range of depth data values.

X. The system of paragraph V, the operations further comprising: determining a first object within the region, based at least in part on an output of the two-dimensional convolution operation, wherein the first object spans the first depth quanta and the second depth quanta.

Y. The system of paragraph U, wherein determining the top-down scene data comprises: determining a first range of a first dimension of the top-down scene data based at least in part on a width of the region; and determining a second range of a second dimension of the top-down scene data based at least in part on a predetermined number of depth quanta.

Z. A method comprising: receiving two-dimensional image data captured by a camera in an environment, the two-dimensional image data including a first pixel and a second pixel; receiving depth data associated with the two-dimensional image data, the depth data including first depth data associated with the first pixel and second depth data associated with the second pixel, wherein the first depth data is different from the second depth data; quantizing the depth data; storing, as scene data, data derived from the two-dimensional image data and the quantized depth data; and performing a two-dimensional convolution operation on the scene data, wherein one of the dimensions corresponds to depth data.

AA. The method of paragraph Z, wherein determining the scene data comprises: determining a three-dimensional representation of the environment, based at least in part on the two-dimensional image data and the quantized depth data; and determining a top-down view of the three-dimensional representation.

AB. The method of paragraph AA, wherein quantizing the depth data comprises: quantizing the first depth data into a first depth quanta; and quantizing the second depth data into a second depth quanta, wherein the first depth quanta is different from the second depth quanta.

AC. The method of paragraph AB, wherein the first depth quanta is associated with a first range of depth data values, and the second depth quanta is associated with a second range of depth data values greater than the first range of depth data values.

AD. The method of paragraph AB, further comprising performing an object detection algorithm on the scene data, wherein performing the object detection algorithm comprises: performing the two-dimensional convolution operation on the top-down view; and determining a first object within the environment, based at least in part on an output of the two-dimensional convolution operation, wherein the first object spans the first depth quanta and the second depth quanta.

AE. The method of paragraph Z, further comprising: performing a two-dimensional object detection algorithm on the two-dimensional image data; and determining a two-dimensional bounding box, based at least in part on an output of the two-dimensional object detection algorithm, wherein determining the scene data is based at least in part on the two-dimensional bounding box.

AF. The method of paragraph Z, wherein the scene data is stored as at least one of: a point cloud; a three-dimensional grid; or a multi-channel image.

AG. The method of paragraph Z, further comprising: performing a first two-dimensional object detection algorithm on the two-dimensional image data; performing a second two-dimensional object detection algorithm on the scene data, the second two-dimensional object detection algorithm including the two-dimensional convolution operation; determining an object within the two-dimensional image data, based at least in part on a first output of the first two-dimensional object detection algorithm, and a second output of the second two-dimensional object detection algorithm; and controlling an autonomous vehicle within the environment, based at least in part on determining the object within the two-dimensional image data.

AH. One or more non-transitory computer-readable media storing processor-executable instructions that, when executed by one or more processors, cause the one or more processors to perform operations comprising: receiving two-dimensional image data captured by a camera in an environment, the two-dimensional image data including a first pixel and a second pixel; receiving depth data associated with the two-dimensional image data, the depth data including first depth data associated with the first pixel and second depth data associated with the second pixel, wherein the first depth data is different from the second depth data; quantizing the depth data; storing, as scene data, data derived from the two-dimensional image data and the quantized depth data; and performing a two-dimensional convolution operation on the scene data, wherein one of the dimensions corresponds to depth data.

AI. The one or more non-transitory computer-readable media of paragraph AH, wherein determining the scene data comprises: determining a three-dimensional representation of the environment, based at least in part on the two-dimensional image data and the quantized depth data; and determining a top-down view of the three-dimensional representation.

AJ. The one or more non-transitory computer-readable media of paragraph AI, wherein quantizing the depth data comprises: quantizing the first depth data into a first depth quanta; and quantizing the second depth data into a second depth quanta, wherein the first depth quanta is different from the second depth quanta.

AK. The one or more non-transitory computer-readable media of paragraph AJ, wherein the first depth quanta is associated with a first range of depth data values, and the second depth quanta is associated with a second range of depth data values greater than the first range of depth data values.

AL. The one or more non-transitory computer-readable media of paragraph AJ, the operations further comprising performing an object detection algorithm on the scene data, wherein performing the object detection algorithm comprises: performing the two-dimensional convolution operation on the top-down view; and determining a first object within the environment, based at least in part on an output of the two-dimensional convolution operation, wherein the first object spans the first depth quanta and the second depth quanta.

AM. The one or more non-transitory computer-readable media of paragraph AH, the operations further comprising: performing a two-dimensional object detection algorithm on the two-dimensional image data; and determining a two-dimensional bounding box, based at least in part on an output of the two-dimensional object detection algorithm, wherein determining the scene data is based at least in part on the two-dimensional bounding box.

AN. The one or more non-transitory computer-readable media of paragraph AH, wherein the scene data is stored as at least one of: a point cloud; a three-dimensional grid; or a multi-channel image.

While the example clauses described above are described with respect to particular implementations, it should be understood that, in the context of this document, the content of the example clauses can be implemented via a method, device, system, a computer-readable medium, and/or another implementation. Additionally, any of examples A-## may be implemented alone or in combination with any other one or more of the examples A-##.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples.

A non-limiting list of objects in an environment may include but is not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system for controlling a vehicle comprising:
one or more processors; and
one or more non-transitory computer-readable media storing computer-executable instructions that, when executed, cause the system to perform operations comprising:
receiving two-dimensional image data representing an environment;
determining, based at least in part on a two-dimensional object detection algorithm, a region of the two-dimensional image data associated with an object in the environment, wherein the region includes a first pixel and a second pixel;
receiving, based on inputting the two-dimensional image data to a depth estimation algorithm, depth data associated with the two-dimensional image data, wherein the depth estimation algorithm is trained using ground truth depth data and ground truth image data to enable outputting the depth data without the inputting of associated depth data corresponding to the two-dimensional image data;
quantizing the depth data to determine quantized depth data;
determining top-down scene data associated with the environment, based at least in part on the two-dimensional image data and the quantized depth data;
performing a two-dimensional convolution operation on the top-down scene data, wherein one of a plurality of dimensions corresponds to depth data;
determining a first object within the environment, based at least in part on an output of the two-dimensional convolution operation; and
controlling the vehicle within the environment, based at least in part on determining the object within the two-dimensional image data.

2. The system of claim 1, wherein determining the top-down scene data comprises:
wherein the depth data including first depth data associated with the first pixel and second depth data associated with the second pixel, wherein the first depth data is different from the second depth data;
quantizing the first depth data into a first depth quanta; and
quantizing the second depth data into a second depth quanta, wherein the first depth quanta is different from the second depth quanta.

3. The system of claim 2, wherein the first depth quanta is associated with a first range of depth data values, and the second depth quanta is associated with a second range of depth data values different from the first range of depth data values.

4. The system of claim 2, the operations further comprising:
determining a first object within the region, based at least in part on an output of the two-dimensional convolution operation, wherein the first object spans the first depth quanta and the second depth quanta.

5. The system of claim 1, wherein determining the top-down scene data comprises:
determining a first range of a first dimension of the top-down scene data based at least in part on a width of the region; and
determining a second range of a second dimension of the top-down scene data based at least in part on a predetermined number of depth quanta.

6. A method for controlling a vehicle comprising:
receiving two-dimensional image data captured by a camera in an environment, the two-dimensional image data including a first pixel and a second pixel;
receiving, based on inputting the two-dimensional image data to a depth estimation algorithm, depth data associated with the two-dimensional image data, the depth data including first depth data associated with the first pixel and second depth data associated with the second pixel, wherein the first depth data is different from the second depth data, wherein the depth estimation algorithm is trained using ground truth depth data and ground truth image data to enable outputting the depth data without the inputting of associated depth data corresponding to the two-dimensional image data;
quantizing the depth data to determine quantized depth data;
storing, as scene data, data derived from the two-dimensional image data and the quantized depth data;
performing a two-dimensional convolution operation on the scene data, wherein one of a plurality of dimensions corresponds to depth data;
determining an object within the environment, based at least in part on an output of the two-dimensional convolution operation; and
controlling the vehicle within the environment, based at least in part on determining the object within the two-dimensional image data.

7. The method of claim 6, wherein determining the scene data comprises:
determining a three-dimensional representation of the environment, based at least in part on the two-dimensional image data and the quantized depth data; and
determining a top-down view of the three-dimensional representation.

8. The method of claim 7, wherein quantizing the depth data comprises:
quantizing the first depth data into a first depth quanta; and
quantizing the second depth data into a second depth quanta, wherein the first depth quanta is different from the second depth quanta.

9. The method of claim 8, wherein the first depth quanta is associated with a first range of depth data values, and the second depth quanta is associated with a second range of depth data values greater than the first range of depth data values.

10. The method of claim 8, further comprising performing an object detection algorithm on the scene data, wherein performing the object detection algorithm comprises:
performing the two-dimensional convolution operation on the top-down view; and
determining a first object within the environment, based at least in part on an output of the two-dimensional convolution operation, wherein the first object spans the first depth quanta and the second depth quanta.

11. The method of claim 6, further comprising:
performing a two-dimensional object detection algorithm on the two-dimensional image data; and
determining a two-dimensional bounding box, based at least in part on an output of the two-dimensional object detection algorithm,
wherein determining the scene data is based at least in part on the two-dimensional bounding box.

12. The method of claim 6, wherein the scene data is stored as at least one of:
a point cloud;
a three-dimensional grid; or
a multi-channel image.

13. The method of claim 6, further comprising:
performing a first two-dimensional object detection algorithm on the two-dimensional image data;
performing a second two-dimensional object detection algorithm on the scene data, the second two-dimensional object detection algorithm including the two-dimensional convolution operation;
determining an object within the two-dimensional image data, based at least in part on a first output of the first two-dimensional object detection algorithm, and a second output of the second two-dimensional object detection algorithm; and
controlling an autonomous vehicle within the environment, based at least in part on determining the object within the two-dimensional image data.

14. One or more non-transitory computer-readable media storing processor-executable instructions that, when executed by one or more processors, cause the one or more processors to perform operations for controlling a vehicle comprising:
receiving two-dimensional image data captured by a camera in an environment, the two-dimensional image data including a first pixel and a second pixel;
receiving, based on inputting the two-dimensional image data to a depth estimation algorithm, depth data associated with the two-dimensional image data, the depth data including first depth data associated with the first pixel and second depth data associated with the second pixel, wherein the first depth data is different from the second depth data, wherein the depth estimation algorithm is trained using ground truth depth data and ground truth image data to enable outputting the depth data without the inputting of associated depth data corresponding to the two-dimensional image data;
quantizing the depth data to determine quantized depth data;
storing, as scene data, data derived from the two-dimensional image data and the quantized depth data;
performing a two-dimensional convolution operation on the scene data, wherein one of a plurality of dimensions corresponds to depth data;
determining an object within the environment, based at least in part on an output of the two-dimensional convolution operation; and
controlling the vehicle within the environment, based at least in part on determining the object within the two-dimensional image data.

15. The one or more non-transitory computer-readable media of claim 14, wherein determining the scene data comprises:
determining a three-dimensional representation of the environment, based at least in part on the two-dimensional image data and the quantized depth data; and
determining a top-down view of the three-dimensional representation.

16. The one or more non-transitory computer-readable media of claim 15, wherein quantizing the depth data comprises:
quantizing the first depth data into a first depth quanta; and
quantizing the second depth data into a second depth quanta, wherein the first depth quanta is different from the second depth quanta.

17. The one or more non-transitory computer-readable media of claim 16, wherein the first depth quanta is associated with a first range of depth data values, and the second depth quanta is associated with a second range of depth data values greater than the first range of depth data values.

18. The one or more non-transitory computer-readable media of claim 16, the operations further comprising performing an object detection algorithm on the scene data, wherein performing the object detection algorithm comprises:
performing the two-dimensional convolution operation on the top-down view; and
determining a first object within the environment, based at least in part on an output of the two-dimensional convolution operation, wherein the first object spans the first depth quanta and the second depth quanta.

19. The one or more non-transitory computer-readable media of claim 14, the operations further comprising:
performing a two-dimensional object detection algorithm on the two-dimensional image data; and
determining a two-dimensional bounding box, based at least in part on an output of the two-dimensional object detection algorithm,
wherein determining the scene data is based at least in part on the two-dimensional bounding box.

20. The one or more non-transitory computer-readable media of claim 14, wherein the scene data is stored as at least one of:
a point cloud;
a three-dimensional grid; or
a multi-channel image.

* * * * *